(12) United States Patent
Baldwin

(10) Patent No.: US 9,549,115 B1
(45) Date of Patent: Jan. 17, 2017

(54) PRISM ARRAY DEPTH SENSING AUTO-FOCUS

(71) Applicant: Amazon Technologies, Inc., Seattle, WA (US)

(72) Inventor: Leo Benedict Baldwin, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 25 days.

(21) Appl. No.: 14/492,783

(22) Filed: Sep. 22, 2014

(51) Int. Cl.
*H04N 5/232* (2006.01)
*G02B 7/28* (2006.01)
*H04N 5/225* (2006.01)

(52) U.S. Cl.
CPC ............ *H04N 5/23212* (2013.01); *G02B 7/28* (2013.01); *H04N 5/2258* (2013.01)

(58) Field of Classification Search
None
See application file for complete search history.

(56) References Cited

U.S. PATENT DOCUMENTS

| | | | |
|---|---|---|---|
| 5,237,362 A | 8/1993 | Ishino | |
| 6,816,199 B1* | 11/2004 | Ide | G03B 3/00 348/315 |
| 7,405,762 B2 | 7/2008 | Nonaka | |
| 7,576,796 B2* | 8/2009 | Kanayama | H04N 5/23212 348/350 |
| 8,139,142 B2* | 3/2012 | Bamji | G01S 17/89 348/335 |
| 8,531,560 B2 | 9/2013 | Kimura | |
| 8,619,182 B2 | 12/2013 | Fainstain | |
| 8,890,942 B2* | 11/2014 | Ogasahara | H04N 5/2254 348/345 |
| 2003/0117719 A1* | 6/2003 | Wakai | G02B 13/0045 359/726 |

(Continued)

OTHER PUBLICATIONS

Richard Butler. "Exclusive: Fujifilm's phase detection system explained." <http://www.dpreview.com/articles/2151234617/fujifilmpd> Aug. 5, 2010, 5 pages.

(Continued)

*Primary Examiner* — Shahbaz Nazrul
(74) *Attorney, Agent, or Firm* — Sutherland Asbill & Brennan LLP

(57) ABSTRACT

An depth sensing (AF) module including a depth sensing (DS) lens, DS image sensor, a prism array, and a DS controller is disclosed. The DS module may be configured to provide a control signal to an electromechanical device, such as a voice coil motor (VCM), of an image capture module to move a lens assembly to focus an image of an object to be imaged onto a primary image sensor. The DS module may direct the capture of an image for depth sensing by the DS image sensor and perform a depth sensing (DS) technique on the captured DS image to identify a focus point of the lens assembly. The DS technique may identify a magnitude of a split in segments of the DS image, where the segments correspond to light refracted through different prism elements of the array of prism elements. This determined focus point may be used to displace the lens assembly relative to the primary image sensor to achieve focus of the object onto the primary image sensor.

20 Claims, 8 Drawing Sheets

(56) References Cited

U.S. PATENT DOCUMENTS

| | | | |
|---|---|---|---|
| 2003/0184669 A1* | 10/2003 | Nishioka | G02B 7/102 348/335 |
| 2006/0044454 A1* | 3/2006 | Kuwakino | H04N 5/23212 348/350 |
| 2007/0047942 A1* | 3/2007 | Chang | G02B 7/08 396/133 |
| 2010/0166405 A1* | 7/2010 | Moon | G02B 7/34 396/104 |
| 2011/0063484 A1 | 3/2011 | Fujii et al. | |
| 2013/0250067 A1* | 9/2013 | Laxhuber | H04N 13/0296 348/47 |
| 2013/0341493 A1* | 12/2013 | Ando | G01C 3/32 250/208.1 |
| 2015/0098005 A1 | 4/2015 | Tsai | |
| 2015/0365609 A1 | 12/2015 | Mine | |
| 2015/0373252 A1* | 12/2015 | Georgiev | H04N 5/2259 348/349 |

OTHER PUBLICATIONS

"Evolution into the X-Trans CMOS II Sensor with Phase Detection Pixels. AF Speed Achieving the Level of Single Lens Reftex Cameras." <hllp:I/fujifilm-x.com/development_story/en/sensor> 4 pages.

"Zhang, Michael; ""A Demo of Split Screen and Microprism Ring Focusing in Old SLRs."" Published Jan. 2, 2013. Accessed Sep. 22, 2014 at: http://petapixel.com/2013/01/02/a-demo-of-split-screen-and-microprism-ring-focusing-in-old-slrs/ (9 pgs.)".

* cited by examiner

PRISM ARRAY DEPTH SENSING AUTO-FOCUS

BACKGROUND

Imaging systems with semiconductor image sensors (e.g., charge coupled device (CCD) image sensors, complementary metal oxide semiconductor (CMOS) image sensors, etc.) may use a variety of mechanisms for autofocus of an image to be captured. These mechanisms may use, for example, a sweep through a range of the focal lengths to find an appropriate focal length that produces a sharp image. These types of mechanisms may require a relatively long time to find the appropriate focal distance and may lead to a relatively poor user experience. Other mechanisms may include using phase detection (PD) where some of the pixels of the image sensor may be devoted to identifying a focal length and/or the focal displacement, or split screen autofocus, where vernier mechanisms may be used to achieve autofocus.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1:
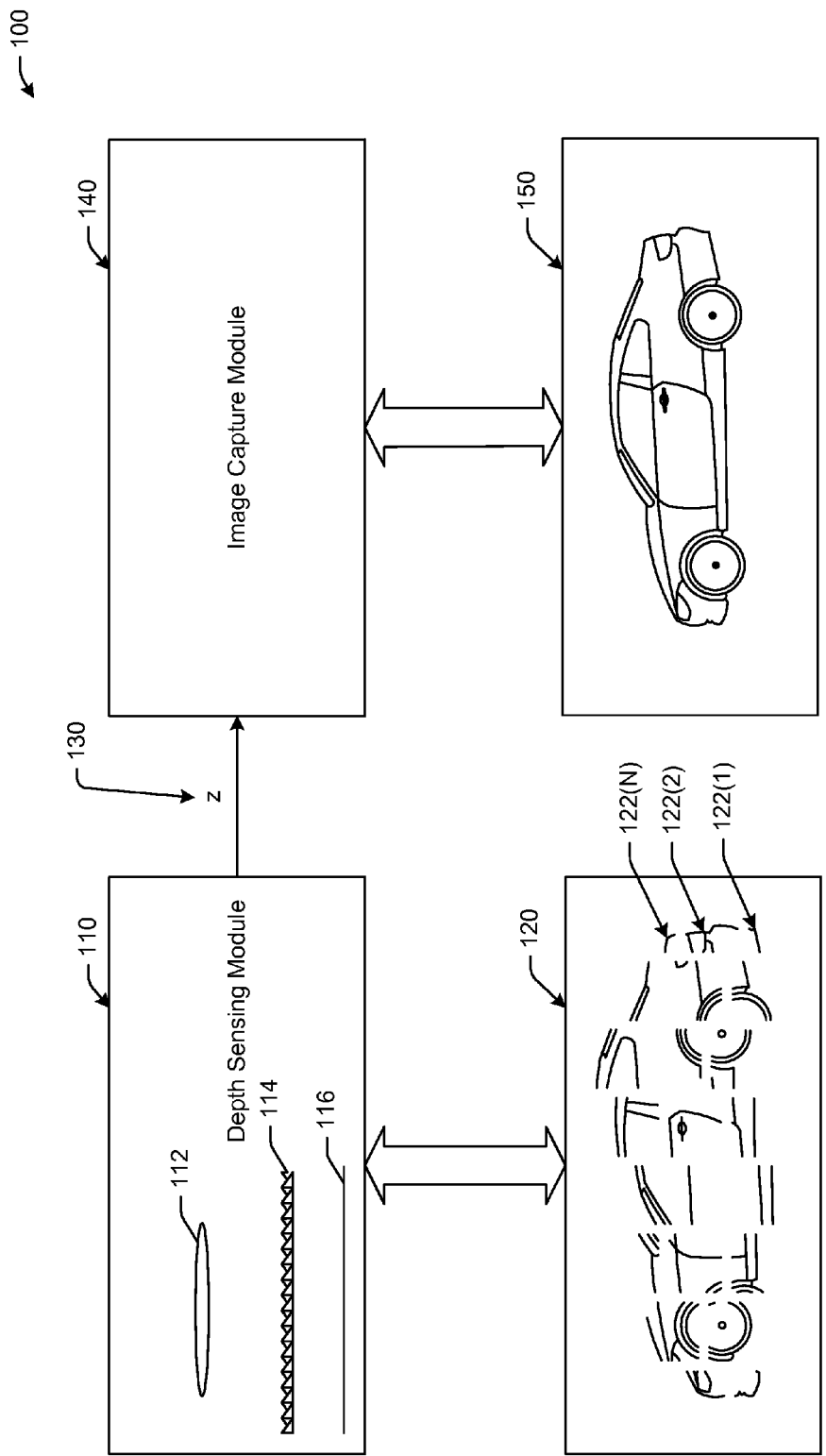
FIG. 1 is a schematic diagram that illustrates an example environment where a depth sensing module provides one or more parameters and/or autofocus control signals to an image capture module for capturing an image, in accordance with example embodiments of the disclosure.

Example embodiments of the present disclosure are directed to, among other things, autofocus (AF) for the capture of images. The AF for the capture of images may be implemented on any variety of user devices, such as a camera, smart phone, tablet computing device, laptop computer, wearable user devices, or the like. In example embodiments, a depth sensing (DS) module may be configured to identify one or more parameters that may be used to control aspects of an image capture module, such that the image capture module captures a focused image of an object in a scene to be imaged.

According to example embodiments, a DS module may include an image for depth sensing sensor module. The DS image sensor module, in example embodiments, may include a DS image sensor and optical elements, such as one or more lenses or other optical elements, arranged as a lens assembly. The DS image sensor may be any suitable type of image sensor, such as a complementary metal oxide semiconductor (CMOS) and/or charge coupled device (CCD) image sensor. In example embodiments, the DS image sensor module may be a fixed focus-lens configuration. In other words, in these example embodiments, the distance between the DS image sensor and a lens assembly of the DS image sensor module may be fixed. Put yet another way, the nodal distance, or the distance between the node of the lens assembly of the DS image sensor module and the imaging plane, or otherwise a location of photosensitive pixel elements of the DS image sensor, may be fixed in these example embodiments. Additionally, in these example embodiments, the focal length of the optical element(s) (e.g., lenses) may be fixed.

The DS module may further have an array of prisms disposed between the lens assembly of the DS module and the DS image sensor. The array of prisms may be a transparent or translucent optical element that has prism elements, such as triangular prism elements disposed thereon. These prism elements may be disposed in a two-dimensional array. When light passes through these individual prism elements, the light may refract in a manner such that the image produce by the light passing through adjacent prism elements are displaced from each other. In other words, if an object is to be imaged, the light reflected from that object or emitted by that object may be incident upon the DS lens assembly and pass therethrough. That light may then be incident upon and pass through two different prism elements of the array of prism elements. As a result, the light passing through two different prism elements may produce a discontinuity in an image of an object from which the light is reflected and/or emitted. In effect, the defocus of the optics (e.g., the image plane of the DS lens assembly is not in the same position as the DS image sensor) may manifest itself as a vernier (e.g., discontinuity in the image). The level of displacement of one part of the image to another part of the image (e.g., the discontinuity) may be correlated to the level of defocus of the image.

In example embodiments, the array of prisms with an areal tiling of prism elements through which light may pass, may produce an image that is discontinuous in both a horizontal direction (e.g., a x-direction on a Cartesian plane) and vertical direction (e.g., a y-direction on a Cartesian plane). In other words, the DS image sensor may capture an image for depth sensing with a number of image segments. Each of the image segments may correspond to a respective one of the prism elements through which light may pass and impinge on the DS image sensor. The boundaries of each of the image segments may correspond to the boundaries of each of the prism elements of the array of prism elements. The number of these segments of the DS image may be equal to the number of prism elements disposed on the array of prisms. The image segments may be imaged on any suitable number of photosensitive pixels of the DS image sensor. In example embodiments, the number of photosensitive pixels that may image an image for depth sensing segment may be approximately the same for each of the image segments. In some example embodiments, the number of photosensitive pixels of the DS image sensor that image a particular image segment may be approximately the total number of photosensitive pixels of the DS image sensor divided by the total number of prism elements of the prism array.

According to example embodiments, the DS module may further include a DS controller. The DS controller may be configured to determine that an image is to be captured, such as based at least in part on user input(s) to a user device on which the DS module is disposed. The DS module may be further configured to obtain an image for depth sensing signal and/or image data corresponding to an image captured by the DS image sensor module. The image signal and/or image data may provide imaging parameters (e.g., intensity) for a plurality of pixels, where each pixel may represent a corresponding respective areal segment of a scene that is imaged by the DS image sensor in the image for depth sensing corresponding to the image signal. The number of pixels represented in the image signal and the aspect ratio (e.g., ratio of horizontal pixels to vertical pixels) of the collection of pixels, or frame of the image, may be based at least in part on the layout of the photosensitive elements of the DS image sensor. The image for depth sensing corresponding to the image signal, in some cases, may not be in focus. In other words, the point of focus of a particular object from the scene imaged in the image for depth sensing may not lie on the imaging plane (e.g., within a depth of focus (DOF) of the photosensitive pixel elements of the DS image sensor). Furthermore, as this image may be generated by light from the scene to be imaged passing through the prism array and the prism elements thereon, in example embodiments, the image for depth sensing data received by the DS controller may correspond to a plurality of segments of the image for depth sensing, where each segment corresponds to each of the prism elements.

In example embodiments, the image capture module may include a primary image sensor. This primary image sensor may be any suitable type, such as active pixel, CMOS, or CCD image sensor devices. The image capture module may further include one or more optical elements, such as one or more lenses arranged as a lens assembly, one or more optical filters disposed on the image capture image sensor, and an electromechanical device, such as a voice coil motor (VCM) or a piezomotor. In example embodiments, the electromechanical device may be mechanically attached to the primary image sensor lens assembly and may be controlled, such as by the DS module, to move the lens assembly relative to the primary image sensor of the image capture module. In this way, the nodal distance of the image capture module, or in other words, the distance between the node of the lens assembly to the imaging plane, where the primary image sensor is located, may be controlled. As a result, the DS module may be configured to control the location of the lens assembly of the image capture module relative to the primary image sensor by moving the lens assembly to the focus point, or at least within a depth of focus (DOF) of the focus point, in the image capture module. Therefore, at this relative location of the primary image sensor relative to the lens assembly of the image capture module, as controlled by the DS controller, an image captured of the scene by the image capture module may result in an object of the scene being in focus. It will be appreciated that in alternate example embodiments, the DS module may control the movement of the primary image sensor, rather than the lens assembly, to place the primary image sensor at the focus point of the lens assembly of the image capture module. In these example embodiments, the primary image sensor, rather than the lens assembly, may be mechanically coupled to the electromechanical device and movable by the electromechanical device.

In example embodiments, the focus point of the particular object, such as a person's face, to be focused in the scene to be imaged may be determined by a depth sensing (DS) technique performed by the DS controller on the image for depth sensing data received from the DS image sensor module. By performing DS, the DS controller may be configured to determine the focus point corresponding to a particular object for the lens assembly of the image capture module. The DS mechanism allows for relatively fast determination of both the direction and the distance of the focus point relative to the imaging plane.

Based at least in part on the image for depth sensing data, corresponding to an image for depth sensing captured by the DS image sensor, the DS controller may be configured to identify the image segments (e.g., the segments corresponding to each of the prism elements of the prism array of the DS module). The DS controller may further be configured to determine the level of displacement (e.g., distance or misalignment) between each of the image segments relative to adjacent image segments. This misalignment distance between adjacent image segments may be determined, in example embodiments, in both the horizontal and vertical directions for each image segment relative its adjacent image segments. In this way, the DS controller may be configured to identify an array (e.g., a two dimensional array) of misalignment distances between each of the image segments. From this array of misalignment distances, or subsets thereof, the DS controller, in example embodiments, may be configured to determine a focus point associated with the image capture module that may be utilized to focus an image captured by the image capture module. This focus point may be determined by the DS controller by identifying a misalignment distance associated with a particular object to be focused in the image to be captured by the image capture module from the determined array of misalignment distances. In some example embodiments, only the misalignment distance(s) associated with the object to be focused in the scene may be determined by the DS controller.

In some example embodiments, the bounds (e.g., segment border pixels) of the segments of the image for depth sensing may be determined by identifying sharp contrast and/or discontinuities in the images of features in the image for depth sensing. In some example embodiments, a transform, such as a Fourier transform (e.g., fast Fourier transform (FFT)) may be performed to find high contrast regions of the image for depth sensing to identify the borders of the image segments.

Once the image segments are identified, the misalignment of the image segments may be determined. In some example embodiments, a pixel from a first image segment and a pixel from a second image segment may be identified to be adjacent to each other if the discontinuity and/or misalignment did not exist between the first and second image segments. In other words, the pixel from the first image segment and the pixel from the second image segment would be adjacent to each other had the light received by the DS image sensor not been refracted by the prism elements of the prism array. This identification may be performed, for example, by identifying pixels that are similar in color, contrast, and/or intensity, and thereby indicating that the features and/or regions imaged by those pixels may be in close proximity in the subject side of the optics. Upon identifying the pixels that should otherwise be adjacent to each other if the optical imaging path had not included the prism array, a distance between the first and the second pixels may be determined such as by counting the number of pixels, or the corresponding distance in micrometers, by which the first pixel of the first image segment is offset from the second pixel of the second image segment. Although this description refers to determining a misalignment of a split image using a single pixel from each of two adjacent image segments (e.g., splits), it will be appreciated that the misalignment distance may be determined from an ensemble of pixels that may be adjacent to each other had the image for depth sensing been in focus. In this way a level of discontinuity and/or misalignment may be determined between any two adjacent image segments, corresponding to light passing through adjacent prism elements of the prism array, in either or both of the vertical and horizontal direction.

Once the misalignment distance of image for depth sensing area segments corresponding to the object to be focused in the scene of the image is determined, this misalignment distance may be used to determine autofocus (AF) control signal. In some example embodiments, the misalignment distance may be referenced in a look-up table, such as a look-up table stored in a storage device and/or memory of the imaging system, to identify a corresponding AF control signal. In example embodiments, the look-up table may specify parameters of the AF control signal corresponding to the misalignment distance determined from image segments with portions of the an image of the object to be focused. These parameters may include any one of voltage magnitude, current magnitude, frequency, phase, combinations thereof, or the like. In some cases, particularly when the look-up table may be relatively sparse, interpolation and/or extrapolation may be performed to identify the AF control signal corresponding to the segment misalignment distance. This AF control signal may then be provided to the image capture module and particularly to the electromechanical device to displace the lens assembly of the image capture module by a distance such that the focus point of the object to be focused falls on the photosensitive pixels of the primary image sensor. This distance or separation between the lens assembly (e.g., the nodal point of the lens assembly) from the photosensitive pixels of the primary image sensor may be referred to as the focus point. The focus offset distance, as used hereinafter, is the distance (e.g., negative or positive value) between the derived focus plane of the particular object in the image capture module and the current position of the primary image sensor. In some example embodiments, the determination of the AF control signal may include determination of the image capture module focus point (e.g., the distance from the lens assembly of the image capture module where the image of the object is relatively in focus). The focus point may be determined by the DS controller, such as by accessing a first look-up table that may be stored in a datastore and/or memory of the imaging system (e.g., mobile user device), to identify an image capture focus point corresponding to the misalignment distance determined from the image for depth sensing and the segments therein. In some cases, particularly when the look-up table may be relatively sparse, interpolation and/or extrapolation may be performed to identify the image capture module focus point corresponding to the segment misalignment distance. After the image capture module focus point is determined, the DS controller may determine focus offset distance by identifying the current location of the lens assembly relative to the primary image sensor in the image capture module. This current location information, in example embodiments, may be received from the image capture module, such as from one or more sensors disposed in the image capture module. In other example embodiments, the lens assembly may have a predetermined rest position when the image capture module is not used and that rest position may be known by the DS controller. In yet other example embodiments, the DS controller may assume that the image capture module remains in its last known position, such as when the imaging system was last used to capture an image.

The DS controller, according to example embodiments, may further be configured to generate an AF control signal based at least in part on the focus offset needed to produce a relatively focused image of the particular object in the scene to be imaged by the image capture module. Once the focus offset distance is determined, the DS controller may be configured to access a second look-up table that may be stored in a datastore and/or memory of the imaging system (e.g., mobile user device), to identify the AF control signal corresponding to the determined focus offset distance and/or the focus point of the image capture module. The AF control signal may be based at least in part on the direction and magnitude of the desired focus offset. In particular, the AF control signal may be used to control the electromechanical device to move the lens assembly of the image capture module back or forth (e.g., further or closer to the primary image sensor) to place the lens assembly at approximately a location such that the focus point of the image capture module falls on the photosensitive pixels of the primary image sensor. In some example embodiments, the AF control signal may be an analog drive signal provided to the electromechanical device to power and/or control the electromechanical device to obtain a movement substantially equal to the desired focus offset and to place the lens assembly approximately the distance of the focus point of the image capture module away from the primary image sensor. For example, a direct current (DC) voltage or current that corresponds to the magnitude of displacement of a VCM may be provided to the VCM-type electromechanical device on which the primary image sensor is disposed. The DC voltage, in example embodiments, may be provided by a digital-to-analog (DAC) component of the DS controller. In example embodiments, the AF control signal may be determined by the DS controller from a look-up table, such as a look-up that provides values (e.g., magnitude, frequency, phase, etc.) of image capture control signals corresponding to various desired focus offset distance. In other example embodiments, the image capture control signal may be determined by the DS module from one or more analytical models and/or equations to derive values (e.g., magnitude, frequency, phase, etc.) of image capture control signals corresponding to a desired focus offset distance.

In other example embodiments, the focus offset distance may be analytically calculated and then used to identify a corresponding AF control signal, such as by accessing a look-up table. The DS controller, in example embodiments, may be configured to utilize the determination of the focus point or focus plane corresponding to the particular object in the DS image sensor module to determine a focus point or focus plane in the image capture module. In other words, the DS controller may be configured to determine the focus point (e.g., the point in the image sensor module where the particular object is to come into focus). This may be determined by the DS controller by identifying a variety of characteristics of the optical elements (e.g., lens) of the image capture module. These identified characteristics may include, for example, the nodal point and/or the focal length or focal point of the optical elements of the image capture module. If the focal point (e.g., the point where parallel incoming light rays converge) of the image capture module is known relative to the focal point of the AF capture image sensor module, then the focus point or focus plane of the image capture module may be determined. Furthermore, if the focus point or focus plane of the particular object for the optical elements of the image capture module is known and the location of the primary image sensor is further known, then the displacement needed to place the primary image sensor at, or within a DOF of, the focus plane may be determined. Therefore, the DS controller may be configured to derive the magnitude and direction of movement (e.g., predefined discrete steps, millimeters, etc.), or focus offset distance, that the lens assembly is to be moved in the image capture module to acquire an image of the scene with the particular object in focus. The image capture module may be moved by controlling the electromechanical device, such as a VCM, to which the lens assembly is mechanically coupled.

In some example embodiments, the imaging system, including the DS module and the image capture module, as described herein, may further have a feedback loop from the image capture module to the DS module. This feedback loop may provide the DS controller with information from the image capture module about where the primary image sensor is located relative to the image capture module lens assembly. This information may be transmitted by one or more sensors of the image capture module. For example, this information may be provided by a hall sensor and/or a piezo-sensor of the image capture module. The feedback signal received by the DS controller from the image capture module may be used by the DS controller to determine if the primary image sensor is within a spatial threshold of its intended location as determined by the DS controller. This spatial threshold, in example embodiments, may be a fixed threshold value, such as, for example, a predetermined number of micrometers. In some example embodiments, the spatial threshold may be approximately equal to the depth of focus (DOF), or some fraction or multiple thereof. In other example embodiments, the spatial threshold may be a percentage of the total movement of the lens assembly effected by the electromechanical device. In some cases, one or more forces (e.g., gravity) may influence the electromechanical device and/or primary image sensor such that the primary image sensor has not been displaced by the focus offset distance and, therefore, is not at its intended location. In this case, the DS controller may be configured to modify the image capture control signal, either up or down, to bring the image capture lens assembly so that the focus point in the image capture module is to within the spatial threshold of the photosensitive pixels of the primary image sensor.

In some example embodiments, the DS controller may direct the capture of an image signal and determine that the image for depth sensing may have been captured in a low light condition. This image for depth sensing, therefore, may not provide enough information to perform a DS that is likely to produce an accurate and precise determination of the focus point of the lens assembly of the image capture module. In this case, the DS controller may direct the illumination by an illuminator (e.g., light emitting diode (LED), light bulb, etc.) of the object and/or scene to be imaged using an illuminator. While the scene is illuminated, the DS controller may direct the acquisition of another image for depth sensing data corresponding to a new image for depth sensing. This new image for depth sensing data may provide enough information to perform DS for the purpose of identifying the focus point at the image capture module for the object to be imaged.

In example embodiments, the illumination by the illuminator may include visible light (e.g., approximately 380 nm to 750 nm) and/or near-infrared light (NIR) light (e.g., approximately 750 nm to 1125 nm). The DS image sensor may also be configured to be sensitive to some wavelengths in the visible wavelengths and the NIR wavelengths. In some cases, the DS image sensor may not have an NIR filter disposed thereon. As a result, the DS image sensor may be configured to capture light in the NIR range. By capturing a relatively wide spectrum of light to perform DS, the DS image sensor may be configured to capture the requisite level of light, even at relatively low light conditions (e.g., night time, low indoor light, etc.).

The DS module may still further, in some example embodiments, be configured to provide a depth map that may be appended to an image file, such as in metadata. This depth map may be generated based at least in part on the image for depth sensing acquired by the DS image sensor, as directed by the DS controller. The depth may include the depth of various pixels in the image space, corresponding to various areal segments in the subject space of the scene that is imaged. This depth map may be generated by the DS module based on the image for depth sensing. The DS controller may determine an array, such as a two dimensional array of misalignment distances corresponding to each of the image segments, which in turn correspond to each of the prisms of the prism array through which light reflecting off of a scene are refracted prior to reaching the DS image sensor. After generating the array of misalignment distances, such as in displacement pixels or micrometers, the DS controller may be configured to identify a depth corresponding to each misalignment distance element in the generated misalignment distance array. This may be accomplished, in example embodiments, by accessing a look-up table to identify a depth in the object space corresponding to each of the determined misalignment distances of the image segments. In example embodiments, the image map may be appended to image data file captured by the image capture module, such as metadata. This type of depth information may be accessed and utilized by any variety of imaging applications for any type of image manipulation and/or analysis.

The discussion above may be understood with reference to FIG. 1. FIG. 1 is a schematic diagram that illustrates an example environment 100 where a depth sensing module 110 provides one or more parameters and/or autofocus control signals 130 to an image capture module 140 for capturing an image 150, in accordance with example embodiments of the disclosure.

As indicated, the DS module 110 may be configured to acquire an image for depth sensing 120. The DS module 110 may include a one or more optical elements (e.g., lens), arranged as a lens assembly 112, and an image sensor 116 that have a fixed distance from each other. As a result, one or more objects in the image for depth sensing 120 may not be in focus. Indeed, depending on the distance from the DS module 110 of object(s) to be imaged, the image for depth sensing 120 may or may not be in focus. Furthermore, the DS module 110 may have an array of prisms 114 with an areal tiling of prisms in the optical path of light impinging on the DS image sensor 116. As a result, the light impinging on the DS image sensor may be refracted differently through adjacent prisms of the array of prisms 114. This may lead to discontinuities or segmentation of the image for depth sensing 120. As a result, when the image for depth sensing 120 is rendered, there may be a number of image segments 122(1), 122(2), . . . 122(N), referred to hereinafter, collectively or individually, as image segments 122. Each of the image segments 122 may correspond to respective prisms of the array of prisms. In other words, each image segment 122 may represent the light collected by a corresponding grouping of photosensitive pixels of the DS image sensor of light that passes through a single prism of the array of prisms. Two adjacent image segments, such as image segments 122(1) and 122(2), may be representative of and corresponding to light that passes through two adjacent prisms of the prism array of the DS module.

The captured image for depth sensing 120 may be used by the DS module 110 to determine a focus point of one or more objects in the image for depth sensing 120. A misalignment between image segments 122 of the image for depth sensing from the DS image sensor may be used to determine the focus point of the image capture module. In some example embodiments, the misalignment of each of the image segments 122 may be determined relative to its adjacent image segments to generate an array of misalignment distance values. This array of misalignment distances may then be used to generate a depth map of the scene being imaged by the DS module 110 and the image capture module 140.

In some example embodiments, the misalignment distance corresponding to the object to be focused in image 150 may be used to identify a corresponding AF control signal 130 to provide to the image capture module 140 to control the electromechanical device therein. In other example embodiments, one or more intermediary processes of determining a focus point of the DS module, determining the focus point of the image capture module, and/or determine the focus offset distance of the image capture module may be performed to arrive at the AF control signal. The focus point at the DS module 110 may be may be used to determine the distance of the object that is to be focused in the captured image 150. This object distance may be determined based at least in part on the focal length of the DS lens assembly. After determining the object distance on the object side of the lens, the object distance may be used to determine the focus point of the image capture module 140 and the image capture lens assembly therein. This focus point of the image capture module may be determined by knowing the focal length of the image capture module lens and the object distance as determined by the DS module. Once the focus point of the image capture module is determined, the difference between the current location of the image capture lens assembly and the primary image sensor may be determined and a control signal 130 may be produced to move the lens assembly so that the focus point lies on the primary image sensor in the image capture module 140. This determined control signal, when provided to the image capture module 140 by the AF module, enables the electromechanical device in the image capture module 140 to drive the lens assembly such that focus is achieved. At this point, the object may be in focus and the image 150 may be captured by the image capture module 140.

It will be appreciated that the systems and methods as disclosed herein may not rely on a sweep through a range of distances between the image capture lens assembly and the primary image sensor or sweeping through a range of focal lengths of the image capture lens. These sweep techniques may take a greater amount of time than the DS and/or split image techniques, as described herein. Additionally, it should be noted that in the systems and methods as described herein, a dedicated DS module 110 is used for the purposes of implementing DS-based AF. Therefore, in the image capture module 140, photosensitive pixels of the image capture image sensor may not be dedicated for performing phase detect technique on the image to be capture. Therefore, substantially all of the pixels, in example embodiments, of the image capture image module may be used for the purposes of capturing the image 150. As a result, in these embodiments, additional image processing techniques, some of which may be processing bandwidth intensive and/or relatively slow, may not be needed to separate phase detect dedicated pixels from the imaging-dedicated pixels of the primary image sensor. The implementation of the DS module 110 in directly driving the image capture image sensor to its focus point may be relatively quick, and thereby result in a relatively enjoyable user experience with the imaging systems and methods, as described herein.

It will also be appreciated that by having the DS module 110 separated from the image capture module 140, the DS module 110, and the image capture image sensor therein may be optimized for the purposes of AF, while the image capture module 140, and the image capture image sensor may be optimized for the purposes of image capture. For example, a high pixel-count (e.g., small pixel size) image sensor may be utilized in the image capture module 140 to produce sharp images. The DS image sensor, on the other hand, may be a relatively lower pixel count image sensor with larger pixel sizes. As a result, light may be captured relatively quickly, even in relatively low light conditions, for the purposes of DS. Therefore, a relatively lower pixel count DS image sensor may enable a relatively fast AF determination. Furthermore, in example embodiments, the DS image sensor may not have an IR filter and/or a color filter disposed thereon. As a result, a relatively large spectrum of light may be used for the purposes of DS or split image analysis by the DS module 110.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 2:
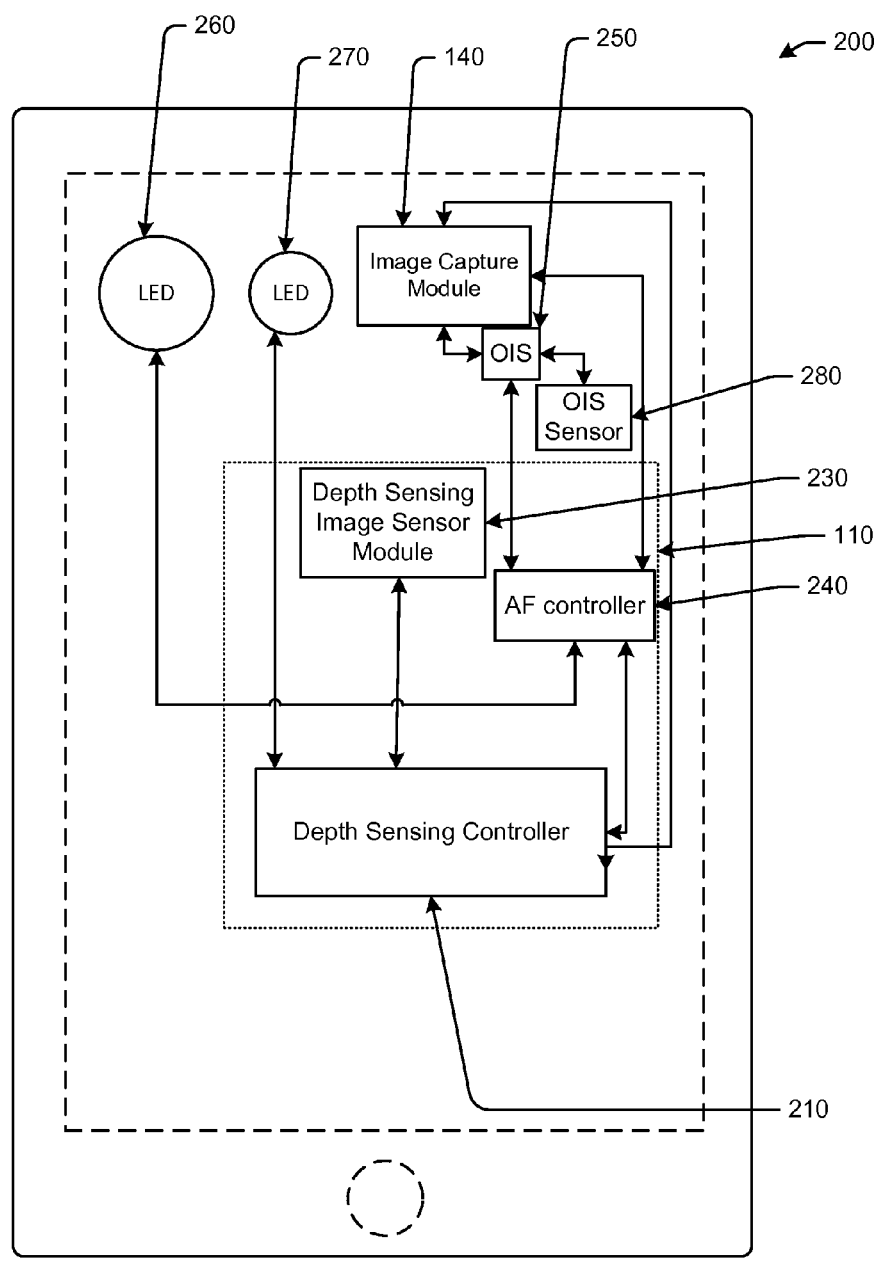
FIG. 2 is a schematic diagram of an example user device including the depth sensing module and the image capture module of FIG. 1, in accordance with example embodiments of the disclosure.

FIG. 2 is a schematic diagram of an example user device 200 including the depth sensing module 110 and the image capture module 140 of FIG. 1, in accordance with example embodiments of the disclosure. The user device may be any suitable user device 200 or imaging system that may be used to capture an image. The user device 200, while depicted as a smartphone, may be one of any variety of client devices, electronic devices, communications devices, mobile devices, and/or imaging systems with image capture capability. The user device 200 may include, but is not limited to, tablet computing devices, electronic book (ebook) readers, netbook computers, notebook computers, laptop computers, desktop computers, personal digital assistants (PDA), smart phones, web-enabled televisions, video game consoles, set top boxes (STB), smartphones, smart appliances, wearable devices, cameras, combinations thereof, or the like.

The user device 200 may include the DS module 110 and the image capture module 140. As depicted in FIG. 2 and discussed above, the DS module 110, in example embodiments, may include an image for depth sensing sensor module 230 and an AF controller 240. The DS image sensor module 230 may be configured to capture a image for depth sensing and provide an DS image signal to the DS controller 210. The DS controller 210 may be configured to direct the DS image sensor module 230 to capture the image for depth sensing. In example embodiments, the DS controller 210 may be configured to receive an indication that an image is to be captured, such as from a user input or from another entity, such as one or more other processor(s). The one or more processor(s), such as application processors, may be configured to control one or more imaging or non-imaging functions of the user device 200. In some example embodiments, the DS sensing controller may also serve as the application processor(s) of the user device 200. Upon receiving an indication that an image is to be captured, the DS controller 210 may direct capture of the image for depth sensing 120. The DS controller 210 may further be configured to determine the control signals 130 to focus the image capture module 140. In example embodiments, the DS controller 210 may be configured to identify a low light condition of an image captured by the DS image sensor. Such an image, in example embodiments, may lack an intensity dynamic range to enable the determination of the control signal 130. If the range of intensities of the pixels of the image for depth sensing is not sufficiently great (e.g., the difference between the dimmest pixels and brightest pixels do not span a sufficiently large intensity range), then it may be difficult to make a reliable DS determination. In other words, to distinguish features (e.g., images of an object) in an image for depth sensing, the intensity dynamic range must be sufficiently large so that the SNR is sufficiently large to recognize features in the image for depth sensing and determine DS values therefrom. The DS controller 210 may be configured to determine if the intensity range or contrast of the image meets a minimum threshold value. In this case, the DS controller 210 may be configured to direct the illumination of the scene to be imaged for the purposes of capturing the AF image 120. Directing the illumination of the scene may entail directing an illuminator, such as light emitting diode (LED) 260 to emit light. In example embodiments, the LED 260 may be configured to provide light in the near-ultraviolet, visible, and/or IR spectrum.

The image capture module 140 may be configured to receive a control signal from the DS module 110. The received control signal may be used to displace the lens assembly of the image capture module 140 so that the focus point of the object to be imaged lies on the primary image sensor of the image capture module 140. In example embodiments, the capture of the image 150 may be directed by the DS controller 210 and/or other processor(s) of the user device 200, or any other suitable controller. In some example embodiments, the capture of the image 150 by the image capture module 140 may be performed in relatively low-light conditions. In these example embodiments, the image capture module 140 may be configured to acquire the image 150 with an illumination of the scene to be imaged. This illumination may be performed using an illuminator, such as LED 270. The LED 270, in example embodiments, may be configured to illuminate the scene to be imaged using primarily light in the visible spectrum. In example embodiments, the DS controller 210, or other suitable entities, such as an application processor of the user device 200 may be configured to direct the LED 270 to illuminate the scene to be imaged when the image capture module 140 is to capture the image 150.

In example embodiments, the user device 200 may optionally include an optical image stabilizer (OIS) 250 that may be configured to receive sensor signals from one or more sensor(s) 280, such as a gyroscope and/or accelerometer. These sensor signals may be used by the OIS 250 to reduce the effects of vibration of the user device 200 while capturing the image 150. In some example embodiments, the OIS 250 may be configured to receive one or more user device 200 movement information from the DS module 110 for reducing the effects of vibration of the user device 200 while image 150 is captured. In some example embodiments, the OIS 250 may be configured to identify movement of the user device 200 based on consecutive frames or images received from the DS module 110. The OIS 250 may be configured to identify a set of spatial coordinates for each received frame of a scene from the DS module 110. The OIS 250 may be configured to determine how to move the lens assembly and/or the primary image sensor of the image capture module based at least in part on these determined coordinates based at least in part on the received images from the DS module 110 in addition to gyroscope data to reduce blur due to user device 200 vibration.

Figure 3:
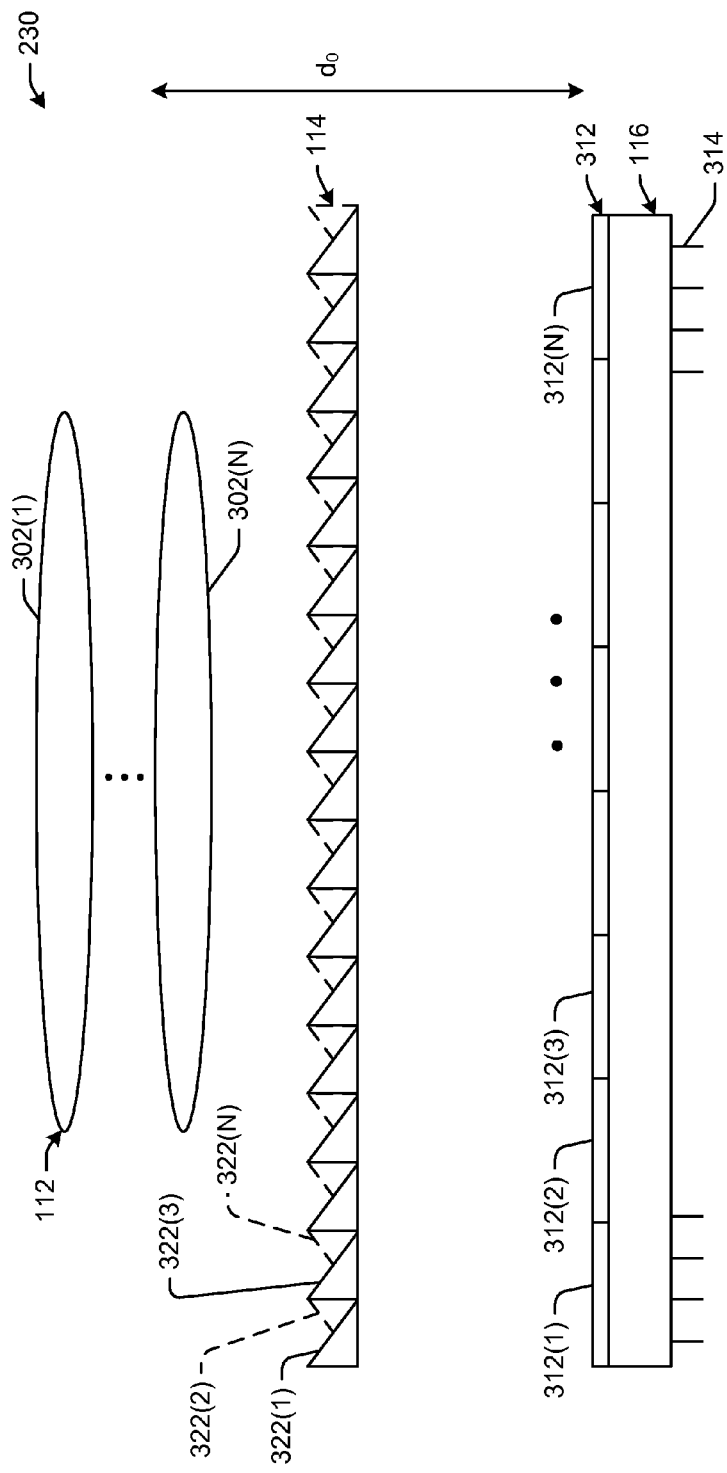
FIG. 3 is a side view schematic diagram of an example depth sensing image sensor module with an array of prisms, in accordance with example embodiments of the disclosure.

FIG. 3 is a side view schematic diagram of an example depth sensing image sensor module 230 with an array of prisms 114, in accordance with example embodiments of the disclosure. The DS image sensor module 230 may include a DS lens assembly 112 that may include one or more optical elements 302(1), . . . , 302(N), such as lenses. The DS image sensor module 230 may further include an image for depth sensing sensor 116, with a plurality of photosensitive pixels 312(1), 312(2), 312(3), . . . , 312(N), hereinafter referred to individually or in combination as photosensitive pixels 312. As discussed above, in example embodiments, the photosensitive pixels 312 of the DS image sensor 116 may be located at a fixed distance ($d_o$) from the DS lens assembly 112 of the DS image sensor module 230. Therefore, in some cases, if $d_o$ does not correspond to the focus point of a particular object to be imaged, then the image for depth sensing 120 captured by the DS image sensor 116 may not be focused. The DS image sensor 116 may further include one or more signal contacts 314 from which captured image signals may be provided to other entities, such as the DS controller 210. Although the signal contacts 314 are depicted at the bottom of the DS image sensor 116 as pins, the signal contacts 314 may be of any suitable types and/or configurations. Although two DS lenses 302(1), 302(N) are depicted, it will be understood that there may be any number of optical elements, including one lens or more than two lenses and/or mirrors. In some example embodiments, the lens assembly 112 may be disposed on a casing or a transparent plate of the user device 200.

The DS image sensor 116 may be any known device that converts an optical image or optical input to a corresponding electronic signal. The DS image sensor 116 may further be of any suitable photosensitive pixel 312 count and aspect ratio. Further still, the DS image sensor 116 may be sensitive to any frequency of radiation, including infrared and near infrared (NIR), visible, and/or near-ultraviolet (UV). In certain example user devices 200, the DS image sensor 116 may be a silicon (Si) based image sensors, such as charge couple device (CCD) or complementary metal oxide semiconductor (CMOS) image sensor. The bandgap of Si, at $E_g=1.1$ electron volts (eV), corresponds to 1125 nanometers (nm) wavelength, which is within the near-infrared (NIR) spectral region. Therefore, the Si material of Si-based image sensors may be sensitive up to a wavelength of about 1125 nm. The spectral sensitivity of these Si-based image sensors may correspond to an optical wavelength range from about 350 nm to about 1125 nm. This may enable the acquisition of spectral information at the visible spectral range corresponding to wavelengths of about 380 nm to about 750 nm and the NIR spectral range corresponding to wavelengths of about 750 nm to about 1125 nm.

For most imaging applications, the spectral information associated with a visible range of wavelengths of about 380 nm to 780 nm is used to generate images. In high quality imaging applications, the capture of NIR spectral information may introduce haze, noise, or otherwise degrade the image in the visible spectral range. Therefore, Si-based image sensors often have NIR filters provided thereon to prevent the detection of radiation in the NIR frequency range for most applications. The NIR filters, by design, may filter out spectral information that may otherwise be captured by the Si-based image sensor. Furthermore, the NIR filters may introduce cost, such as processing and/or material cost during manufacture of the Si-based image sensors. However, for the purposes of determining a focus point, in example embodiments, the light from the full spectral sensitivity range of the DS image sensor 116 may be utilized by the DS controller 210. As a result, in example embodiments, the DS image sensor module 230 may not have any optical filters (e.g., IR or color filters) disposed thereon.

The DS image sensor module 230 may further have an array of prisms 114 with a prism elements 322(1), 322(2), 322(3), . . . , 322(N), hereinafter referred to collectively or individually as prism elements 322. In the perspective shown, the prism element 322(2) and 322(N) are behind prism elements 322(1) and 322(3), respectively. Although, the prism elements here are depicted as triangular prism with a right angle, it will be appreciated that a repeating two dimensional array of any suitable prism may be used, such as non-right angle triangular prism, pyramidal prism, triangle based prism, cone prism, hexagonal prism, or the like. The prism elements 322 may have any suitable size, density, height, width, and grade (e.g., slope of the hypotenuse of the triangular prism). As a result, each prism element may have any suitable corresponding number of photosensitive pixels of the DS image sensor 116. As a non-limiting example, the array of prisms 114 may have 50 prism elements 322 per side for a total of 2500 prism elements 322. The array of prism 114 may be constructed from any suitable materials, such as polymers, polyimides, thermoset materials, other plastics, glass, ceramics, combinations thereof, or the like. The array of prism 114 may be constructed from any suitable process, such as injection molding, stamping, embossing, machining, cutting, gravity-assisted processes, or the like. The array of prisms 114 may be provided in any suitable location, such as mounted to the frame of the mobile device 200, such as a protective transparent glass cover, or disposed on top of or in proximity of the DS image sensor 116, or on or in proximity of the lens assembly module 112.

The sensitivity to depth detected by the DS module 110 may be proportional to the slope of the prisms 322, and the range may be inversely proportional to the slope of the prisms 322. In example embodiments, a relatively optimal slope may be found, having a suitable sensitivity within the DOF of the lens assembly 112 at all points of the lens assembly 112 and that at the same time may have range at least out to the hyperfocal point of the lens assembly 112. In some example embodiments, particularly if a single optimum slope cannot be found, then pairs of prism elements 322 with a relatively steep slope for relatively high sensitivity and pairs of prism elements with a relatively gradual slope for greater range. The data from these prism pairs may be calculated and considered separately. In example embodiments, the distribution of gradual prism pairs 322 and steep prism pairs 322 may not be equal or uniform. For example, the steep prism pairs may be used for relatively macro-focus on the main camera and that may be satisfied by a relatively sparse distribution of steep prism pairs among a field of gradual prism pairs. Any suitable aperture of the lens assembly 112 may be selected to provide a suitable sensitivity to depth measurement by the DS module 110. In example embodiments the aperture of the lens assembly 112 for the DS module 110 may be different from the aperture of the lens assembly on the image capture module 140 to optimize both DS depth-sensitivity and overall light-sensitivity in relatively dark conditions.

Furthermore, most lenses in mobile have a chief ray angle (CRA) that increases from 0 degrees at the center (as measured from a normal to the plane of the sensor) to as much as 32 degrees in the corner. While prism angles near the center of the sensor will be symmetric to the sensor and the CRA, prism angles off-center will be symmetric to the CRA and appear asymmetric relative to the sensor. This will be necessary to give a consistent result while accommodating CRA.

Finally, after all of the offsets are matched to determine a depth map, it may be possible to reconstruct the segmented image of the depth sensor into a reconstructed image that no longer appears broken. This image may have utility, for example, as a preview image when the surroundings are dark and the IR illuminator is being used. In this case, a reconstructed image for depth sensing may provide a better preview image than the gained-up main camera image as in the dark the main camera will not benefit from the IR illuminator and the gained up image will be very noisy.

Figure 4:
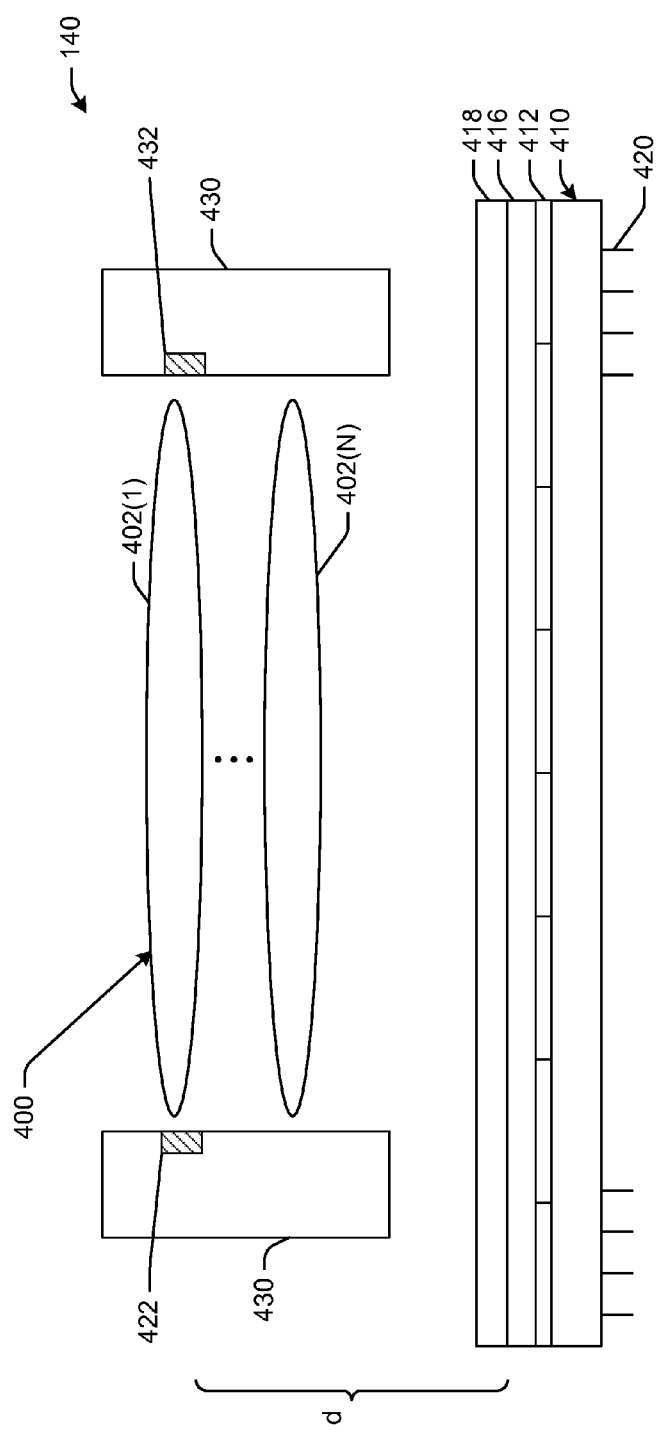
FIG. 4 is a side view schematic diagram of an example image capture module, in accordance with example embodiments of the disclosure.

FIG. 4 is a side view schematic diagram of an example image capture module 140, in accordance with example embodiments of the disclosure. The image capture module 140 may include an image capture lens assembly 400 with one or more optical elements 402(1), 402(N). The image capture module 140 may further include a primary image sensor 410, with a plurality of photosensitive pixels 412 disposed thereon. Although two image capture lenses 402(1), 402(N) are depicted, it will be understood that there may be any number of optical elements, including one or more than two lenses and/or mirrors. In some example embodiments, the image capture lens assembly 400 may be disposed on a casing or a transparent plate of the user device 200.

In example embodiments, the primary image sensor 410 may be of any suitable type (e.g., CCD, CMOS, Active Pixel substrate, etc.), pixel count, and/or pixel aspect ratio. In example embodiments, the primary image sensor 410 may have a greater pixel count than the DS image sensor 116. In example embodiments, the primary image sensor 410 may have smaller area photosensitive pixels 412 than the photosensitive pixels 312 of the DS image sensor 116. The primary image sensor 410 may be sensitive to any frequency of radiation, including IR, NIR, visible, and/or near-ultraviolet (UV). As photons impinge on the photosensitive pixels 412 of the primary image sensor 410, such as photons reflected off of objects in a scene to be imaged, electron-hole pairs may be formed, thereby indicating the optical radiation flux. The primary image sensor 410 may have a color filter array 416, such as a Bayer color filter or a Foveon vertical filter, disposed thereon. The primary image sensor 410 may still further have an IR filter 418 disposed thereon.

As discussed above, in example embodiments, the photosensitive elements 412 of the primary image sensor 410 may be located at a variable distance (d) from the image capture lens assembly 400 of the image capture module 140. The lens assembly 400 may be mechanically coupled and movable by an electromechanical device 430. The electromechanical device 430 may be configured to move the lens assembly 400 relative to the primary image sensor 410. The electromechanical device 430 may be configured to receive a control signal 130, such as from DS controller 210 or the AF controller 240 that may direct the electromechanical device 430 to displace the lens assembly 400 by a focus offset distance, as determined by the DS controller 210. In example embodiments, the electromechanical device 430 may be a voice coil motor (VCM). In these example embodiments, the VCM control signal may be a DC voltage or current received from the AF controller 240 to displace the lens assembly 400 by the focus offset distance so that the focus point of an object to be imaged by the image capture module 140 lies on the photosensitive elements 412 of the primary image sensor. In other example embodiments, the electromechanical device 430 may be a piezomotor or other suitable displacement device that may be used to displace the lens assembly 400 relative to the primary image sensor 410. In some alternative example embodiments, the electromechanical device 430 may be configured to displace the primary image sensor 410 relative to the lens assembly 400. In this case, the electromechanical device may be configured to displace the primary image sensor 410 by the offset distance, according to received AF control signals from the DS module 110, so that the image sensor is at the focus point of an object of the scene to be imaged.

The image capture module 140 may further have one or more displacement sensors 432. The displacement sensor 432 may be configured to provide a signal that indicates the position of the electromechanical device 430 and/or the lens assembly 400. The displacement sensor 432 may be configured to provide a feedback mechanism by providing its signal to the DS controller 210 and/or the AF controller 240. The displacement sensor signal may be used by the AF controller 240 and/or DS controller 210 to adjust a control signal of the electromechanical device 430 if the electromechanical device 430 does not displace the primary image sensor 410 by a target amount. The target amount may not be achieved if the electromechanical device 430 is influenced by one or more forces, such as gravity. For example, if the electromechanical device 430 is a VCM, the physical orientation of the user device 200 relative to the ground may change the influence of gravity on the VCM and, therefore, a feedback mechanism utilizing the displacement sensor signals may be used to tune the displacement (d) of the lens assembly 400 to the desired focus offset distance. In example embodiments, the displacement sensor 432 may be a hall sensor. In other example embodiments, the displacement sensor 432 may be a piezoresistive sensor or any other suitable type of sensor that can be used to measure the displacement of the lens assembly 400.

The image capture module 140 may further include one or more signal contacts 420 from which captured image signals may be provided to other entities, such as the DS controller 210 or other processor(s), such as an application processor of the user device 200. The signal contacts 420 may also serve, in example embodiments, as an electrical conduit to receive the electromechanical device control signal 130 and/or provide the displacement sensor 432 signal. Although the signal contacts 420 are depicted at the bottom of the primary image sensor 410 as pins, the signal contacts 420 may be of any suitable types and/or configurations.

Figure 5:
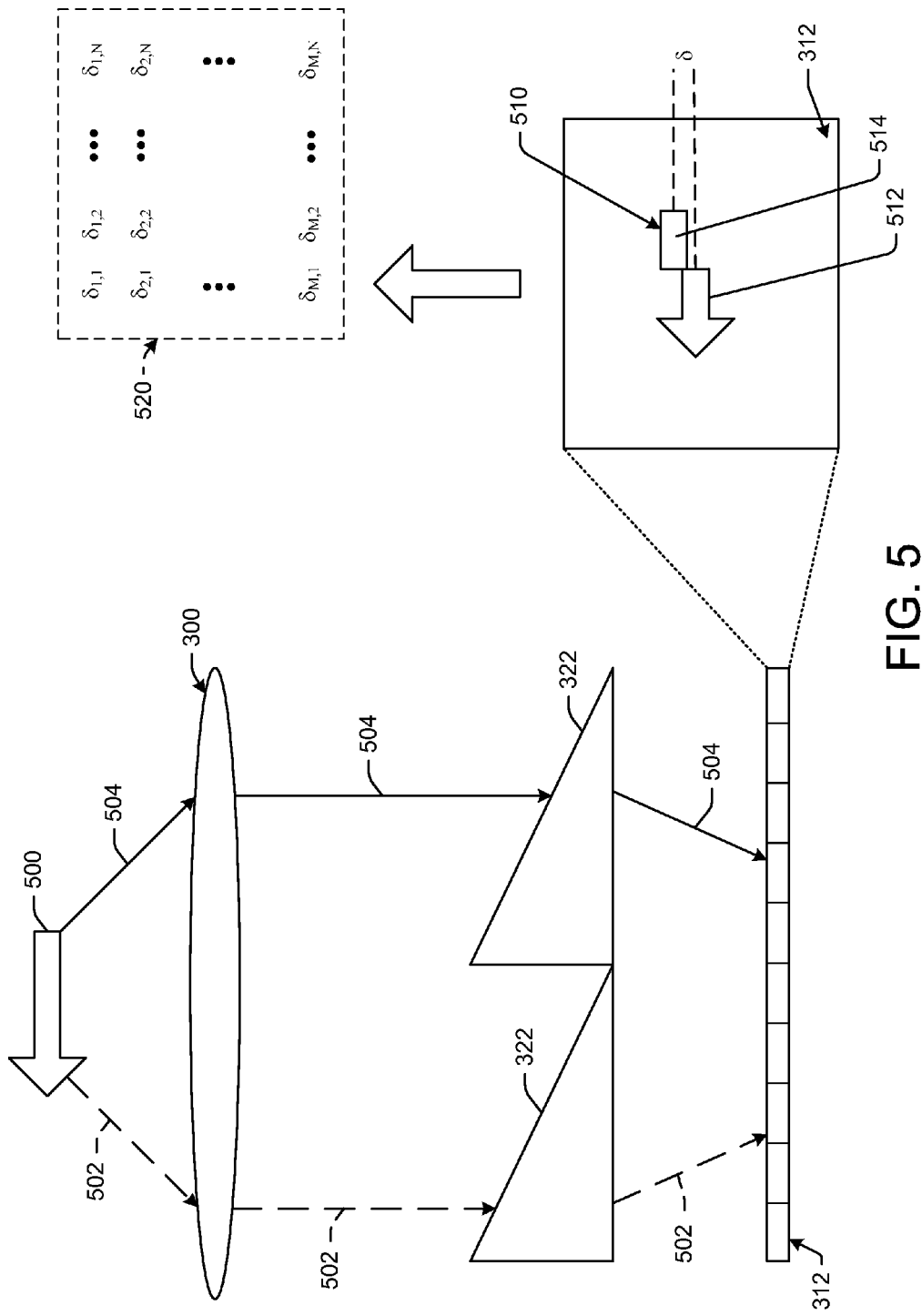
FIG. 5 is a schematic diagram that illustrates an example image including an image of an object captured by the depth sensing module of FIG. 1 to generate an autofocus control signal and/or a depth map corresponding to the image, in accordance with example embodiments of the disclosure.

FIG. 5 is a schematic diagram that illustrates an example image including an image of an object 500 captured by the depth sensing module 110 of FIG. 1 to generate an autofocus control signal and/or a depth map corresponding to the image, in accordance with example embodiments of the disclosure. Light reflecting off of the object 500, such as rays 502, 504 may pass through the lens assembly 112 and then two different prism elements 322. These rays may impinge on different sets of photosensitive pixels 312 of the DS image sensor 116. This may generate an image 510 on the photosensitive pixels 312. The image may have image segments 512, 514 corresponding to each of the prism elements 322. As shown, the segments may be analyzed by the DS controller 210 to determine a misalignment distance ($\delta$) between the first image segment 512 and the second image segment 514. If the object 500 was the object to be focused, then the misalignment distance ($\delta$) between the first DS image segment 512 and the second image segment 514 could be used to determine an AF control signal of the image capture module 140 and the electromechanical device 430 therein. In some example embodiments, there may be more than two prism elements 322 in the array of prisms 114. In this case, the analysis of the misalignment distance ($\delta$) may be performed between any two adjacent prism elements 322 to determine an array of misalignment distance values 520. This array may then be used to determine a depth in the subject space corresponding to each of the misalignment distances ($\delta$). This array of depth in the subject space may be stored, in example embodiments, by the DS controller as depth map corresponding to the image captured by the image capture module 140.

It will be appreciated that many lens assemblies 112 in mobile devices 200 may have a chief ray angle (CRA) that increases from 0 degrees at the center (as measured from a normal to the plane of the sensor) to as much as about 32 degrees at the edges of the lens assembly 112. While prism angles near the center of the sensor may be symmetric to the DS image sensor 116 and the CRA, prism angles off-center may be symmetric to the CRA and appear asymmetric relative to the DS image sensor 116. As a result, this phenomena may be compensated by the depth sensing controller 210 to provide a consistent DS result while accommodating CRA variation.

It will be further be appreciated the after the offsets are determined to generate a depth map 520, in example embodiments, the segmented image 120 may be de-segmented to a reconstructed image that no longer appears broken. This image may have utility, such as, for example, as a preview image when the surroundings are dark and the IR illuminator 260 is being used. In this case, a reconstructed image for depth sensing 120 may provide a better preview image than a preview image generated by the primary image sensor 410.

Figure 6:
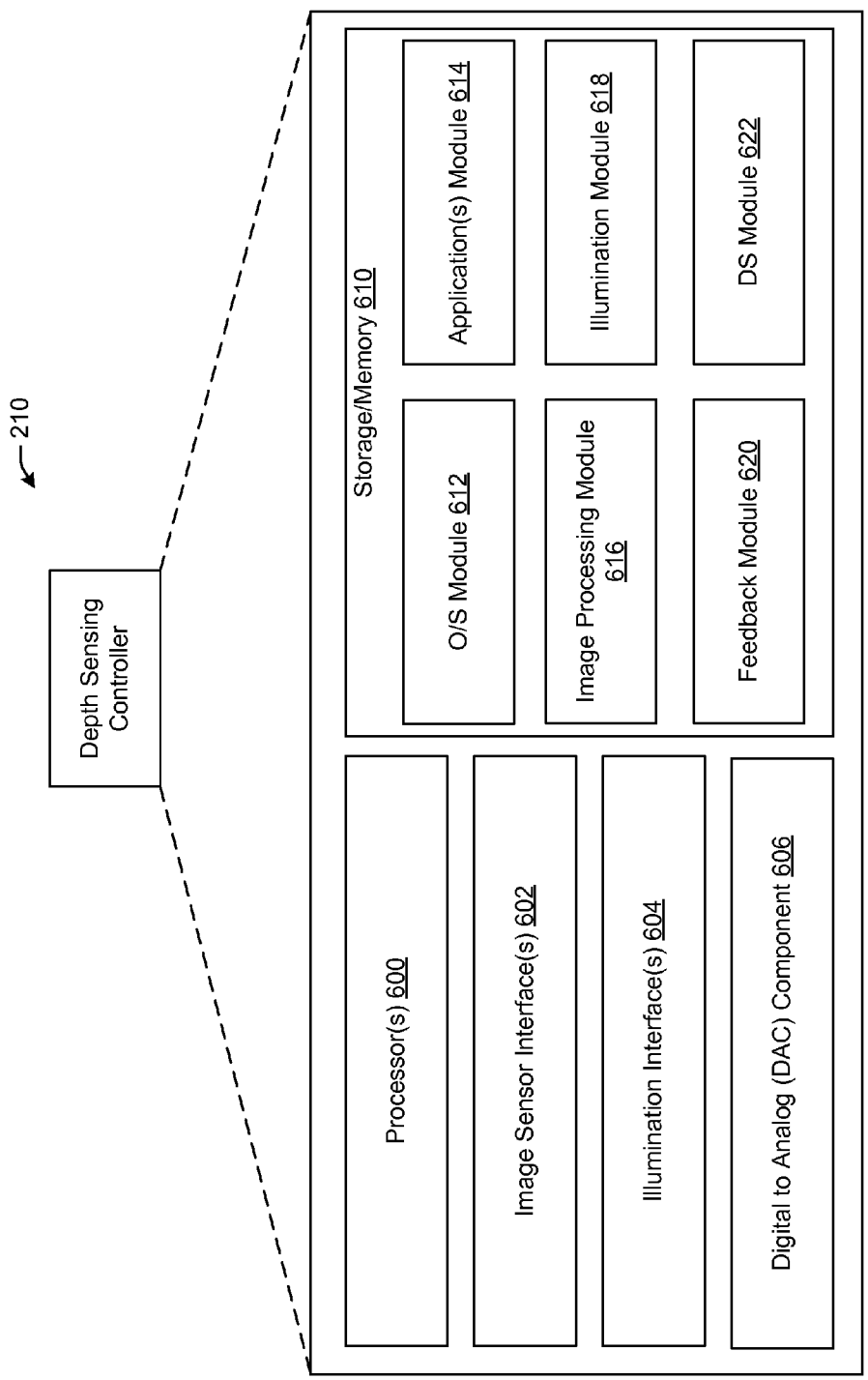
FIG. 6 is a block diagram of an example depth sensing controller for providing an autofocus control signal to the image capture module, in accordance with example embodiments of the disclosure.

FIG. 6 is a block diagram of an example depth sensing (DS) controller 210 for providing an autofocus control signal to the image capture module 140, in accordance with example embodiments of the disclosure. The DS controller 210 may include one or more processor(s) 600, one or more image sensor interface(s) 602, one or more illumination interface(s) 604, a digital-to-analog (DAC) component 606, and one or more storage or memory 610.

In some examples, the processors 600 of the DS controller 210 may be implemented as appropriate in hardware, software, firmware, or combinations thereof. Software or firmware implementations of the DS controller 210 may include computer-executable or machine-executable instructions written in any suitable programming language to perform the various functions described. Hardware implementations of the processors 600 may be configured to execute computer-executable or machine-executable instructions to perform the various functions described. The one or more processors 600 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The DS controller 210 may also include a chipset (not shown) for controlling communications between the one or more processors 600 and one or more of the other components of the user device 200. The one or more processors 600 may also include one or more application specific integrated circuits (ASICs) or application specific standard products (ASSPs) for handling specific data processing functions or tasks.

The image sensor interfaces(s) 602 may allow the DS controller 210 to communicate with the DS image sensor 116 and/or the primary image sensor 410 to direct capture of an image. The image sensor interfaces(s) 602 may further enable receiving image sensor signal(s) from the DS image sensor 116 and/or the primary image sensor 410. The illumination interface(s) 604 may enable the DS controller 210 to direct illumination of a scene by turning on and/or off one or more of the LEDs 260, 270. The digital-to-analog (DAC) component 606 may enable the DS controller 210, which in example embodiments, may be included and/or implemented by the one or more processor(s) 600, to translate a digital control signal value to an analog control signal 130 to provide to the electromechanical device 410 of the image capture module 140.

The memory or storage 210 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The storage/memory 610 may store program instructions that are loadable and executable on the processor(s) 600, as well as data generated or received during the execution of these programs. Turning to the contents of the memory 610 in more detail, the memory 610 may include one or more operating systems (O/S) 612, an applications module 614, an image processing module 616, an illumination module 618, a feedback module 620, and a DS module 622. Each of the modules and/or software may provide functionality for the DS controller 210, when executed by the processors 600. The modules and/or the software may or may not correspond to physical locations and/or addresses in storage/memory 610. In other words, the contents of each of the modules 612, 614, 616, 618, 620, 622 may not be segregated from each other and may, in fact be stored in at least partially interleaved positions on the memory 610.

The O/S module 612 may have one or more operating systems stored thereon. The processors 200 may be configured to access and execute one or more operating systems stored in the (O/S) module 212 to operate the system functions of the device 130. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 614 may contain instructions and/or applications thereon that may be executed by the processors 200 to provide one or more services. These instructions and/or applications may, in certain aspects, interact with the (O/S) module 612 and/or other modules of the DS controller 210. The applications module 614 may have instructions, software, and/or code stored thereon that may be launched and/or executed by the processors 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The instructions and/or functionality stored in the image processing module 616 may be executed by the processors 600 to provide a variety of functionality to the DS controller 210 pertaining to directing the acquisition of the image for depth sensing and processing the image for depth sensing. In example embodiments, the processor(s) 600 may be configured to identify that an image is to be acquired. This may be identified, in some example embodiments, by receiving a message indicating that an image is to be acquired, such as from application processor(s) of the user device 200, which, in example embodiments may include processor(s) 600. After identifying that an image is to be acquired, the DS controller 210 and the processor(s) 600 thereon may be configured to direct the DS image sensor 116 to acquire an image for depth sensing. The processor(s) 600 may further be configured to receive an image for depth sensing signal corresponding to the image for depth sensing acquisition directed by the processor(s) 600. This image for depth sensing may include the particular object that is to be imaged. The image for depth sensing data may be received by the processor(s) 600 via one or more communicative links between the DS image sensor 116 and the processor(s) 600. After receiving the DS image sensor signal, the processor(s) 600 may be configured to identify a focus point of the particular object to be imaged from the DS image sensor signal. In particular, the processor(s) 600 may be configured to identify two or more image segments and misalignments therebetween. In general, the greater the misalignment (e.g., micrometers, number of pixels, etc.), the further the focus point is form the current location of the DS image sensor 116. The processor(s) 600 may be configured, therefore, to analyze the vernier offsets produced by the prism elements 322 of the array of prisms 20 to determine a direction and a distance of the focus point of the particular object relative to the location of the DS image sensor 116. In some example embodiments, the relationship between the determined misalignment distance value and the focus point relative to the location of the DS image sensor 116 may be stored in a look-up table. In these example embodiments, the processor(s) 600 may be configured to access the look-up table where DS-to-focus point relationships are stored, such as in storage/memory 610 or an external datastore, to determine the focus point of the object in the DS module 110. In other example embodiments, analytical equations/models may be used to determine the relationship between defocus and the focus point relative to the location of the DS image sensor 116.

In certain example embodiments, the illumination module 618 may have instructions stored thereon that may enable the processors 600 and the DS controller 210 to provide various functions associated with energizing and/or de-energizing the an illumination source, such as the LED 260. The processor(s) 600 may further be configured to direct the DS image sensor 116 to acquire a first image for depth sensing and may be configured to receive the first DS image signal corresponding to the acquired first image for depth sensing from the DS image sensor 116. In example embodiments, the processor(s) 600 may be configured to analyze the received first image for depth sensing signals and determine that the first image for depth sensing was taken under low-light conditions. Images acquired under low-light conditions may lack enough intensity range (e.g., contrast, sharpness, etc.) of the constituent pixels to enable determining a phase (e.g., defocus) of the particular object. In other words, a low-light condition may preclude the processor(s) 600 from performing a relatively accurate and/or precise DS technique. In example embodiments, the dynamic range of intensity and/or the SNR of the image for depth sensing taken under low-light conditions may be insufficient to produce a relatively accurate and/or precise phase difference assessment. As a result, the processor(s) 600 may further be configured, based at least in part on the determination of a low-light condition, to direct the illumination of the scene to be imaged via an illuminator, such as the LED 260. In example embodiments, the LED 260 may emit light that spans a spectral range that includes near-IR wavelengths (e.g., 750 nm-4000 nm). Upon illumination of the scene by turning on the LED 260, the processor(s) 600 may be configured to direct the acquisition of a second image for depth sensing by the DS image sensor 116. The processor(s) 600 may further be configured to receive the second image for depth sensing, as generated by the DS image sensor 116, responsive to the request for the second image for depth sensing by the processor(s) 600. The second image for depth sensing, as a result of being acquired while the scene to be imaged is illuminated by the LED 260, may not be in a low-light condition and may be usable by the processor(s) 600 for the purposes of determining a focus point, such as by the processes enabled by the image processing module 616.

In certain example embodiments, the feedback module 620 may have instructions stored thereon that may enable the processor(s) 600 and the DS controller 210 to provide various functions associated with receiving feedback from the image capture module 140. The feedback may be signals from displacement sensor 432 that provides information about the current location of the primary image sensor 410. The displacement sensor signals may be solicited and/or received by the processor(s) 600 from the displacement sensor 432. The processor(s) 600 may further be configured to determine the displacement (e.g., referenced to a particular starting location of the primary image sensor 410) and/or the location (e.g., referenced to location of other elements, such as the image capture lens assembly 400) of the primary image sensor 410 based at least in part on the received displacement sensor signals.

In example embodiments, where feedback displacement information (e.g., relative location from the starting location of the primary image sensor 402) is determined from the displacement sensor signals, the processor(s) 600 may be configured to compare the feedback displacement to the desired focus offset distance for bringing the object into focus. If the feedback displacement is not within a threshold of the focus offset distance, as determined by the processor(s) 600 for focusing the particular object, then the processor(s) 600 may be configured to generate an adjusted control signal. The adjusted control signal may be based at least in part on the feedback displacement, the focus offset distance, and initial control signal provided to the electromechanical device 430 of the image capture module 140. In example embodiments, where feedback focus distance (e.g., referenced to location of other elements, such as the image capture lens assembly 400) is determined from the displacement sensor signals, the processor(s) 600 may be configured to compare the feedback focus distance to the desired focus point of the image capture module 140 for bringing the object into focus. If the feedback focus distance is not within a threshold of the focus point, as determined by the processor(s) 600 for focusing the particular object, then the processor(s) 600 may be configured to generate an adjusted control signal. The adjusted control signal may be based at least in part on the feedback focus distance, the focus point for the image capture module, and initial control signal provided to the electromechanical device 430 of the image capture module 140.

In certain example embodiments, the DS module 622 may have instructions stored thereon that may enable the processor(s) 600 and the DS controller 240 to provide various functions associated with generating an AF control signal 130 to provide to the electromechanical device 430 of the image capture module 140. The processor(s) 600 may be configured to determine a focus point, or the distance from the image capture lens 400 to the point where the object to be imaged is in focus, of the image capture module 140, based at least in part on the misalignment distance determined from the image for depth sensing data. In example embodiments, the ascertained depth sensing may be used to find a corresponding focus point of the image capture module 140, such as from a look-up table. This misalignment distance may be used determine a focus offset distance by subtracting the current distance between the lens assembly 400 and the primary image sensor 410 from the determined focus point, which represents the distance between the lens assembly 400 and the primary image sensor 410 where the desired focus is achieved. In example embodiments, the processor(s) 600 may be configured to access a look-up table that maps the misalignment distance(s) to an AF control signals for the image capture module 140. In other example embodiments, the processor(s) 600 may be configured to access a look-up table that maps the misalignment distance(s) to a focus point for the image capture module 140. In this case, after determining the focus point based at least in part on the determined misalignment distance from the image for depth sensing, the AF control single corresponding to the determined focus point of the image capture module 140 and/or focus offset distance may be determined form a second look-up table.

In yet other example embodiments, the processor(s) 600 may be configured to determine a focus point, or the distance from the image capture lens 400 to the point where the object to be imaged is in focus, of the image capture module 140, based at least in part on the focus point of the object for the DS module 110, as determined by the processes enabled by the image processing module 616. In some example embodiments, the focus point of the object for the image capture module 140 may be determined from a look-up table that maps the focus points of the DS module 110 with corresponding focus points of the image capture module 140.

In other example embodiments, analytical equations and/or models may be utilized to determine the focus point of the object to be imaged for the image capture lens 400 of the image capture module 110. For example, in some cases, the focus point of the image capture module 140 may be calculated by the following equation:

$$d_{IC}^{fp} = \left(\frac{1}{f_{IC}} - \frac{1}{f_{DS}} + \frac{1}{d_{DS}^{fp}}\right)^{-1},$$ (Equation 1)

where $d_{IC}^{fp}$ is the focus point of the image capture lens assembly 400, $d_{DS}^{fp}$ is the focus point of the DS lens assembly 112, $f_{IC}$ is the focal length of the image capture lens assembly 400, and $f_{DS}$ is the focal length of the DS lens assembly 112.

It will be appreciated that in Equation 1, if the focal length of the DS lens assembly 112 is equal to the focal length of the image capture lens assembly 400, then the focus point in the image capture module 140 may be the same distance away from the image capture lens assembly 400 as the focus point in the DS module 110 is away from the DS lens assembly 112.

After determining a focus point to bring the object into focus in the image capture module 140, the processor(s) 600 may be configured to determine the current location of the DS lens assembly 112. Based on the difference between the current location of the DS lens assembly 112 and the desired location of the DS lens assembly 112 for the desired focus point of the image capture module 140, a focus offset distance may be calculated. In example embodiments, the processor(s) 600 may be configured to determine the focus offset distance by subtracting the current distance between the lens assembly 400 and the primary image sensor 410 from the determined focus point, which represents the distance between the lens assembly 400 and the primary image sensor 410 where the desired focus is achieved.

After determining the focus offset distance, the processor(s) 600 may be configured to determine a control signal corresponding to the focus offset distance, to be provided to the electromechanical device 430 of the image capture module 140 to move the lens assembly 400 so that the focus point of the image capture module 140 falls on the primary image sensor 410. In example embodiments, this process may be performed in cooperation with or by the AF controller 240. In example embodiments, the AF control signal may be determined by the processor(s) 600 from a look-up table, such as a look-up table that provides values (e.g., magnitude, frequency, phase, etc.) of AF control signals corresponding to various desired focus offset distances. The look-up table, in example embodiments, may be stored in the storage/memory 610 or an external datastore. In other example embodiments, the AF control signal may be determined by the processor(s) 600 from one or more analytical models and/or equations to derive values (e.g., magnitude, frequency, phase, etc.) of image capture control signals corresponding to the desired focus offset distance. In some example embodiments, the AF control signal may be an analog drive signal provided to the electromechanical device 430 to power and/or control the electromechanical device 430 in a manner to obtain a movement substantially equal to the desired focus offset distance to place the lens assembly 410 at a position so that the focus point of the image capture module 140 falls on the primary image sensor 410. For example, a DC voltage that corresponds to the magnitude of displacement of a VCM may be provided to a VCM-type electromechanical device 430 on which the lens assembly 400 is disposed. The DC voltage, in example embodiments, may be provided by the digital-to-analog (DAC) component 606 of the DS controller 210.

It will be appreciated that while the discussion herein is directed to moving the image control image sensor 402 to the focus point, as determined by the processor(s) 600, of the image capture module 140, in some example embodiments, the lens assembly 400 position may be fixed (e.g., the lens assembly 400 may not be configured to move). In these example embodiments, the electromechanical device 430 may be coupled to the primary image sensor 410 to move the primary image sensor such that focus of an object to be imaged is achieved.

It will be appreciated that there may be overlap in the functionality of the instructions stored in the one or more operating systems (O/S) module 612, the applications module 614, the image processing module 616, the illumination module 618, the feedback module 620, and the DS module 622. In fact, the functions of the aforementioned modules 612, 614, 616, 618, 620, 622 may interact and cooperate seamlessly under the framework of the DS controller 240. Indeed, each of the functions described for any of the modules 612, 614, 616, 618, 620, 622 may be stored in any module 612, 614, 616, 618, 620, 622 in accordance with certain example embodiments of the disclosure. Further, in certain example embodiments, there may be one single module that includes the instructions, programs, and/or applications described within the operating systems (O/S) module 212, the applications module 214, the image processing module 616, the illumination module 618, the feedback module 620, and the DS module 622.

Illustrative Processes

Figure 7:
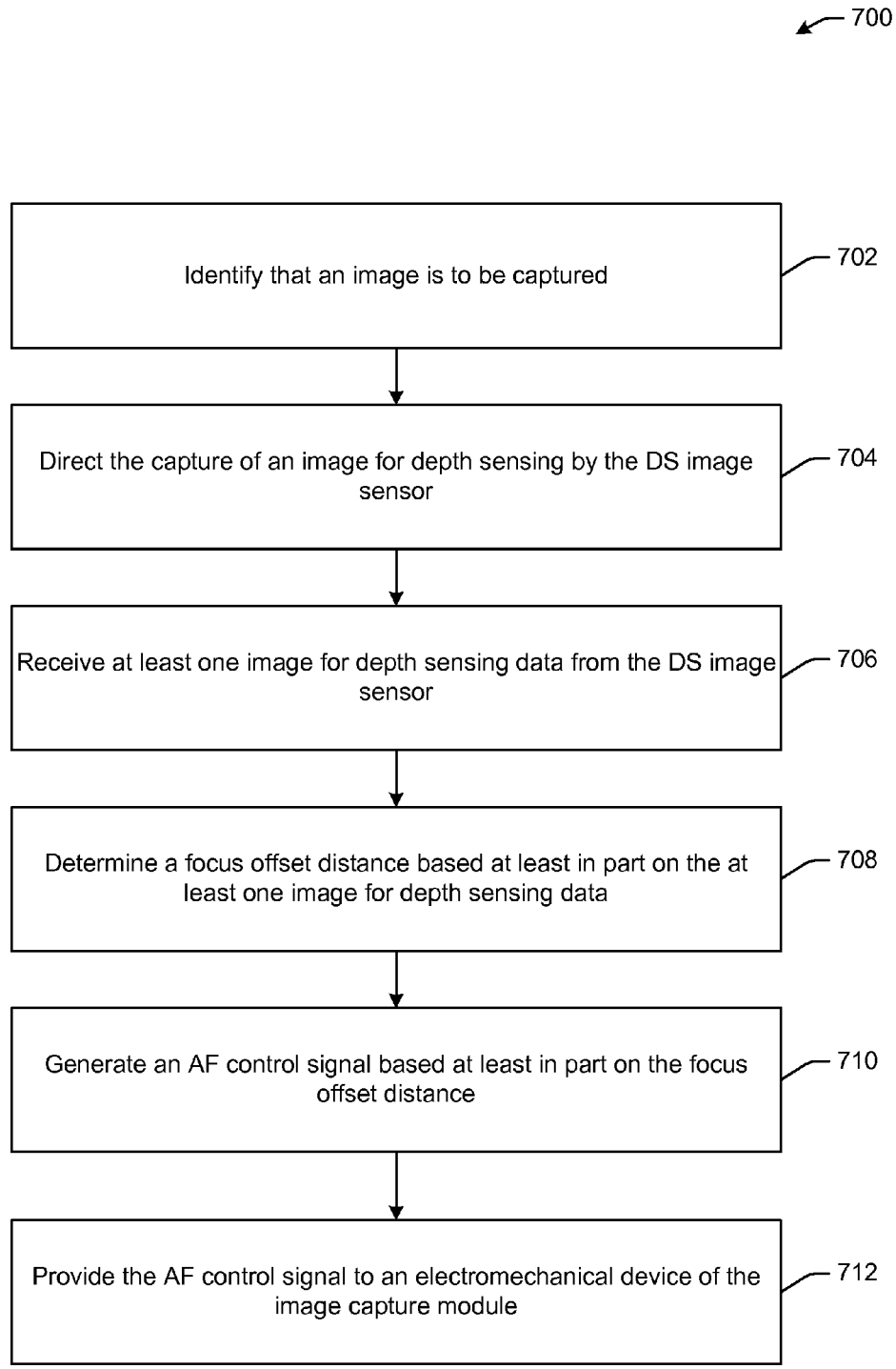
FIG. 7 is a flow diagram illustrating an example method for providing an autofocus control signal to the image capture module, in accordance with example embodiments of the disclosure.

FIG. 7 is a flow diagram illustrating an example method 700 for providing an autofocus control signal 130 to the image capture module 140, in accordance with example embodiments of the disclosure. This method 700, in example embodiments, may be performed by the DS controller 210 and the processors 600 thereon in cooperation with one or more entities of user device 200, such as the image capture module 140 and/or the AF controller 240. At block 702, it may be identified that an image is to be captured. In example embodiments, the DS controller 210 and the processor(s) 600 thereon may receive an indication that an image is to be captured, such as from a user input or from another entity, such as an application processor of the user device 200. In example embodiments, a user may launch and/or interact with an imaging application, such as a picture and/or video capture application on the user device 200. If the user selects a shutter function (e.g., a real or virtual shutter), then this user interaction with the user device 200 may indicate that a picture is to be taken of the scene to which the optics (e.g., DS lens assembly 112 and image capture lens assembly 400) are pointed. At block 704, the capture of an image for depth sensing by the DS image sensor may be directed. The DS controller 210 and the processor(s) 600 thereon may direct the capture of the image for depth sensing by communicating with the DS image sensor 116, such as via signal contacts 314.

At block 706, at least one image for depth sensing data may be received from the DS image sensor. The image for depth sensing data may correspond to an image for depth sensing captured by the DS image sensor 116. The DS controller 210 and the processor(s) 600 thereon may further receive an image for depth sensing data corresponding to the image for depth sensing acquisition directed by the DS controller 210. This image for depth sensing may include the particular object that is to be imaged. Furthermore, the image for depth sensing may have a plurality of image segments corresponding to each of the prism elements 322 of the prism array 114 through which light travels to impinge on the photosensitive pixels 312 of the DS image sensor 116. The image for depth sensing data may be received by the DS controller 210 via one or more communicative links between the DS image sensor 116 and the DS controller 210, such as signal contacts 314.

At block 708, a focus offset distance of the image capture module may be determined based at least in part on the at least one image for depth sensing data. DS controller 210 may identify a focus point of the particular object to be imaged from the DS image sensor signal. In particular, the level of misalignment of image segments 122 may be determined, and based thereon, identify a focus point of the object to be imaged. In general the greater the misalignment distance, the further the focus point is from the current location of the DS image sensor 116. A split image misalignment distance may be determined for the object, in particular, being imaged in the image for depth sensing corresponding to the image for depth sensing data. This may be performed by determining the distance between pixels that would have contiguous image data if the image for depth sensing was in focus. The misalignment distance (e.g., the level of image splitting for adjacent image segments 122) may be used to determine the focus point for the image capture module 140. This may be done by accessing a look-up table that maps detected misalignment distances to focus points of the image capture module 140. From this, the focus offset distance may be determined by finding the difference between the current distance between the lens assembly 400 and the primary image sensor 410 and the determined focus point.

Alternatively, the misalignment distance (e.g., the level of image splitting for adjacent image segments 122) may be analyzed to determine a direction and a distance of the focus point of the particular object relative to the location of the DS image sensor 116. In some example embodiments, the relationship between levels of misalignment distance of the image segments 122 and the focus point relative to the location of the DS image sensor 116 may be stored in a look-up table. In these example embodiments, the look-up table where misalignment-to-focus point relationships are stored, such as in storage/memory 610 or an external data-store, may be accessed to determine the focus point of the object image by the DS module 110. In other example embodiments, analytical equations/models may be used to determine the relationship between defocus and the focus point relative to the location of the DS image sensor 116. In these example embodiments, once the focus point in the DS module 110 is determined, the focus point in the image capture module 140 may be determined, based at least in part on the focus point of the DS module 110. In some example embodiments, the focus point of the object for the image capture module 140 may be determined from a look-up table that maps the focus points of the DS module 110 with corresponding focus points of the image capture module 140. In other example embodiments, analytical equations and/or models may be utilized to determine the focus point of the object to be imaged for the image capture lens assembly 400 of the image capture module 140. For example, in some cases, the focus point of the image capture module 140 may be calculated using Equation 1.

After determining the focus point to bring the object into focus in the image capture module 140, the current location of the lens assembly 112 may be determined. Based on the difference between the current location of the lens assembly 112 and the desired location of the lens assembly 112 at the focus point of the image capture module 140, a focus offset distance may be calculated.

At block 710, an AF control signal may be generated based at least in part on the focus offset distance. After determining the focus offset distance a control signal corresponding to the focus offset distance, to be provided to the electromechanical device 430 of the image capture module 140 to move the lens assembly 400 to the focus point of the image capture module 140, may be determined. In example embodiments, the AF control signal may be determined from a look-up table, such as a look-up that provides values (e.g., magnitude, frequency, phase, etc.) of AF control signals corresponding to various desired focus offset distances. In some cases, if the look-up table is relatively sparse, then interpolation or extrapolation may be performed to determine the AF control signal. In other example embodiments, the AF control signal may be determined using one or more analytical models and/or equations to derive values (e.g., magnitude, frequency, phase, etc.) of AF control signals corresponding to the desired focus offset distance. In some example embodiments, the AF control signal may be an analog drive signal provided to the electromechanical device 430 to power and/or control the electromechanical device 430 in a manner to obtain a movement substantially equal to the desired focus offset distance to place the lens assembly 400 approximately a distance of the focus point of the image capture module 140 away from the primary image sensor 410 in a direction normal to the lens assembly 400. For example, a DC voltage that corresponds to the magnitude of displacement of a VCM may be provided to a VCM-type electromechanical device 410 on which the lens assembly 400 is coupled. The DC voltage, in example embodiments, may be provided by the digital-to-analog (DAC) component 606 of the DS controller 210 and/or the AF controller 240. At block 712, the AF control signal may be provided to an electromechanical device of the image capture module. In example embodiments, this AF control signal may be provided to the electromechanical device 430 via one or more signal contacts 314.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
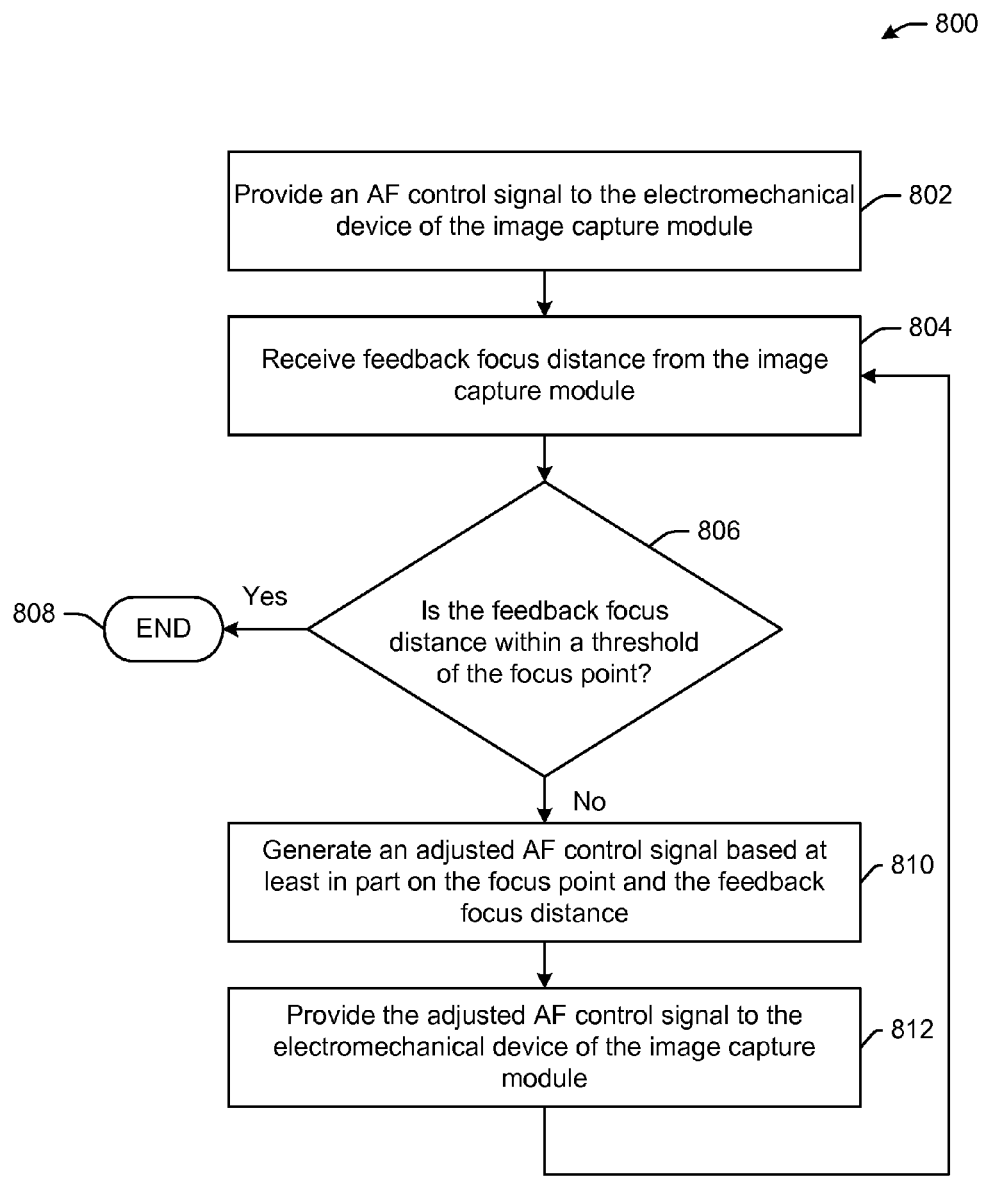
FIG. 8 is a flow diagram illustrating an example method for providing an adjusted autofocus control signal to the image capture module, in accordance with example embodiments of the disclosure.

FIG. 8 is a flow diagram illustrating an example method 800 for providing an adjusted autofocus control signal 130 to the image capture module 140, in accordance with example embodiments of the disclosure. This method 800, in example embodiments, may be performed by the DS controller 210 and the processors 600 thereon in cooperation with one or more entities of user device 200, such as the AF controller 240 and the image capture module 140. At block 802, an AF control signal may be provided to the electromechanical device 430 of the image capture module. These processes may be similar to the processes described in block 712 of method 700 of FIG. 7.

At block 804, a feedback focus distance may be received from the image capture module. The feedback may be signals from displacement sensor 432 that provides information about the current location of the lens assembly 400. The displacement sensor signals may be solicited and/or received by the DS controller 210 or the AF controller 240 from the displacement sensor 432. The feedback focus distance (e.g., the position of the primary image sensor 410 relative to the primary image sensor 410) may be determined based at least in part on the received displacement sensor signals.

At block 806, it may be determined if the feedback focus distance is within a threshold of the focus point for the image capture module. In example embodiments, the threshold may be the depth of focus (DOF) of the image to be captured. In other example embodiments, the threshold may be a fixed distance, such as, for example 1 micrometer (um). If it is determined that the feedback focus distance is within the threshold of the focus point, then at block 808 the method 800 may end. Indeed, at this point, the lens assembly 400 had been moved to a position to capture an in-focus image of the object on which it is to focus. If however, it is determined at block 806 that the feedback focus distance is not within a threshold of the focus point, then at block 810, an adjusted AF control signal may be generated based at least in part on feedback focus distance and the focus point. At block 812, the adjusted AF control signal may be provided to the electromechanical device of the image capture module.

It will be appreciated that in example embodiments, the imaging system 100 may not have a feedback mechanism. In some of these embodiments, the electromechanical device 430 may be relatively deterministic. In other words, in these embodiments, the relation between the AF control signal and the displacement effected by the electromechanical device may be highly repeatable, regardless of other forces acting on the electromechanical device 430 and/or the lens assembly 400. For example a piezomotor may have a relatively stiff and/or deterministic response to an AF control signal and in this case, a feedback mechanism may not be necessary.

It will further be appreciated that in some further example embodiments, an open loop calibration may be employed to set the AF control signal to an appropriate level to achieve a desired offset of the electromechanical device 430. In this case, sensor 432 feedback at multiple points may be used to hone in on an appropriate AF control signal that places the lens assembly 400 at the desired location for focus.

It will still further be appreciated that in some example embodiments, the AF control signal from the DS module 110 provided to the electromechanical device 430 may place the lens module 400 close to the point where focus is achieved. At this point, the DS controller 210 or other processors of the user device 200 may perform a relatively fast contrast detection autofocus, such as at a limited number of spatial locations.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A mobile device, comprising:
a lens to receive light reflected by an object;
a red-green-blue (RGB) image sensor to receive the light via the lens;
a voice coil motor (VCM) mechanically coupled to the lens to move the lens relative to the RGB image sensor;
a prism array having a plurality of prism elements to receive the light reflected by the object;
a panchromatic image sensor to receive light reflected from the object and refracted through the prism array, wherein the prism array is positioned between the object and the panchromatic image sensor;
at least one memory that stores computer-executable instructions; and
at least one processor that accesses the at least one memory, wherein the at least one processor executes the computer-executable instructions to:
  receive image data associated with a first image representing the light received by the panchromatic image sensor;
  determine a plurality of segments of the first image using the image data by identifying discontinuities in the first image, the plurality of segments including a first image segment and a second image segment;
  determine a misalignment distance between the first image segment and the second image segment by determining a level of discontinuity between the first image segment and the second image segment;
  determine, using a look-up table, a focus offset distance corresponding to the misalignment distance;
  provide a VCM control signal, corresponding to the focus offset distance, to the VCM to place the lens the focus offset distance away from the RGB image sensor at, and
wherein a second image of the object is captured by the RGB image sensor after the lens is displaced.

2. The mobile device of claim 1, wherein the panchromatic image sensor includes a first plurality of first photosensitive pixels and the RGB image sensor includes a second plurality of second photosensitive pixels, and wherein each of the first photosensitive pixels have an area greater than each of the second photosensitive pixels.

3. The mobile device of claim 1, wherein the VCM control signal is a second VCM control signal and wherein providing the VCM control signal to the VCM comprises:
generating a first VCM control signal using the focus offset distance;
providing the first VCM control signal to the VCM;
receiving, from a hall sensor coupled to the lens, a first displacement value indicative of a distance of the lens from the RGB image sensor;
determining a first difference value between the focus offset distance and the first displacement value;
determining that the first difference value is greater than a depth of focus (DOF) of the lens;
generating the second VCM control signal corresponding to the first difference;
providing the second VCM control signal to the VCM, wherein the VCM moves the lens by the first difference;
receiving, from the hall sensor, a second displacement value indicative of the distance of the lens from the RGB image sensor;
determining a second difference value between the focus offset distance and the second displacement value; and
determining that the second difference value is less than the DOF of the lens.

4. The mobile device of claim 1, wherein the misalignment distance is a first misalignment distance, wherein the plurality of segments of the first image further includes a third image segment, and wherein the at least one processor executes the computer-executable instructions to further:
determine a second misalignment distance between the third image segment and the second image segment;
determine a first depth using the first misalignment distance and a look-up table mapping misalignment distances to depth;
determine a second depth using the second misalignment distance and the look-up table; and
generate a depth map including the first depth and the second depth, wherein the depth map indicates depth of features in the first image relative to the lens.

5. A method, comprising:
receiving, by a controller comprising one or more computer processors, image data from a first image sensor, wherein the image data corresponds to light passing through a prism array having a plurality of prism elements;
determining a plurality of segments using the image data;
determining a misalignment distance in the plurality of segments using discontinuities corresponding to the image data;
determining, by the controller and based at least in part on the image data, a focus offset distance corresponding to a lens assembly associated with a second image sensor;
determining, by the controller, an autofocus (AF) control signal based at least in part on the focus offset distance; and
providing, by the controller, the AF control signal to an electromechanical device coupled to the lens assembly, wherein the electromechanical assembly moves the lens assembly, to a distance equal to the focus offset distance, relative to the second image sensor.

6. The method of claim 5, further comprising:
determining, by the controller, that an image capture has been requested; and
causing, by the controller, acquisition of the image data.

7. The method of claim 5, wherein the first image sensor includes a plurality of first photosensitive pixels and the second image sensor includes a plurality of second photosensitive pixels, and wherein each of the plurality of first photosensitive pixels have an area greater than each of the plurality of second photosensitive pixels.

8. The method of claim 5, wherein the misalignment distance is a first misalignment distance, and wherein determining the focus offset distance comprises:
determining, by the controller a first image segment and a second image segment each corresponding to the image data, wherein the first image segment corresponds to a first prism element of the plurality of prism elements and the second image element corresponds to a second prism element of the plurality of prism elements;
determining, by the controller, the first misalignment distance between the first image segment and the second image segment; and
determining, by the controller, the focus offset distance based at least in part on the first misalignment distance and a look-up table.

9. The method of claim 8, wherein determining the first misalignment distance further comprises:
identifying, by the controller, a first pixel in the first image segment;
identifying a second pixel in the second image segment; and
determine the first misalignment distance as a distance corresponding to a number of pixels of separation between the first pixel and the second pixel.

10. The method of claim 8, further comprising a second misalignment distance, and wherein the plurality of segments of the image further includes a third image segment, further comprising:
determining, by the controller, a second misalignment distance between the third image segment and the second image segment;
determining, by the controller, a first depth using the first misalignment distance;
determining, by the controller, a second depth using the second misalignment distance; and
generating, by the controller, a depth map including the first depth and the second depth, wherein the depth map indicates depth of features in the image data.

11. The method of claim 10, wherein the image data is a first image data, and further comprising:
receiving, by the controller, second image data from the second image sensor; and
linking, by the controller, the depth map to the second image data.

12. The method of claim 5, further comprising causing, by the controller, an illuminator to illuminate an object associated with the image data, wherein the illuminator emits at least a portion of light in a range of wavelengths between 750 nanometers (nm) and 1125 nm, and wherein the first image sensor is configured to detect at least a portion of the emitted light reflected from the scene.

13. The method of claim 5, wherein the AF control signal is a second AF control signal and wherein providing the AF control signal to the electromechanical device comprises:
generating, by the controller, a first AF control signal based at least in part on the focus offset distance;
providing, by the controller, the first AF control signal to the electromechanical device;

receiving, by the controller and from a sensor coupled to the lens assembly, a first displacement value indicative of a first displacement of the lens assembly from the second image sensor;

determining, by the controller, a first difference between the focus offset distance and the first displacement;

determining, by the controller, that the first difference is greater than a spatial threshold;

generating, by the controller, the second AF control signal corresponding to the first difference;

providing, by the controller, the second AF control signal to the electromechanical device;

receiving, by the controller and from the sensor coupled to the lens assembly, a second displacement value indicative of a second displacement of the lens assembly from the second image sensor; and determining, by the controller, a second difference between the focus offset distance and the second displacement value determining, by the controller, that the second difference is within the spatial threshold.

14. The method of claim 5, wherein determining the AF control signal comprises accessing a look-up table to identify a direct current (DC) voltage corresponding to the focus offset distance.

15. A user device, comprising:
a prism array having a plurality of prism elements to receive and refract light reflecting from an object;
a first image sensor to receive, via the prism array, the light reflecting from the object, wherein the prism array is located between the object and the first image sensor;
a second image sensor and a lens assembly to receive reflected light from the object;
an electromechanical device mechanically coupled to the lens assembly and configured to move the lens assembly; and
a controller comprising:
  memory that stores computer-executable instructions; and
  a processor that accesses the memory, wherein the processor executes the computer-executable instructions to perform:
    receiving image data corresponding to the object from the first image sensor;
    identifying discontinuities corresponding to the image data;
    determining a misalignment distance corresponding to the object based at least in part on the identified discontinuities;
    generating an autofocus (AF) control signal based at least in part on the misalignment distance; and
    sending the AF control signal to the electromechanical device.

16. The user device of claim 15, wherein determining the misalignment distance comprises:
determining a first image segment and a second image segment of an image corresponding to the image data, wherein each of the plurality of segments of the image correspond to each of a respective prism element of the plurality of prism elements; and
determining the misalignment distance as the distance of misalignment of an image of the object spanning across the first image segment and the second image segment.

17. The user device of claim 15, wherein generating the AF control signal comprises:
determining a focus offset distance corresponding to the misalignment distance; and
determining, using a look-up table, the AF control signal based at least in part on the split image misalignment distance.

18. The user device of claim 15, wherein the first image sensor includes a plurality of first photosensitive pixels and the second image sensor includes a plurality of second photosensitive pixels, and wherein each of the first photosensitive pixels have an area greater than each of the second photosensitive pixels.

19. The user device of claim 15, wherein receiving the image data comprises illuminating using an illuminator of an object associated with the image data, wherein the illuminator emits at least a portion of light in a range of wavelengths between 750 nanometers (nm) and 1125 nm, and wherein the first image sensor is configured to detect at least a portion of the emitted light reflected from the scene.

20. The user device of claim 15, wherein the split image misalignment distance is a first misalignment distance, and wherein the image further includes a third image segment, and wherein the processor executes the computer-executable instructions to further perform:
determining a second misalignment distance between the third image segment and the second image segment;
determining a first depth using the first misalignment distance;
determining a second depth using the second misalignment distance; and
generating a depth map including the first depth and the second depth, wherein the depth map indicates depth of features in the image.

* * * * *